(12) United States Patent
Holbrooke et al.

(10) Patent No.: US 11,753,049 B2
(45) Date of Patent: Sep. 12, 2023

(54) LOADING/UNLOADING SYSTEM AND VEHICLE INTERFACE FOR A TRANSPORTATION SYSTEM AND METHODS OF USE

(71) Applicant: Hyperloop Technologies, Inc., Los Angeles, CA (US)

(72) Inventors: Colin Holbrooke, Toluca Lake, CA (US); Jonathan Adam, Playa Del Rey, CA (US); Luke Pearse, Manhattan Beach, CA (US); Joshua Raycroft, Los Angeles, CA (US); Doug Chey, Los Angeles, CA (US)

(73) Assignee: Hyperloop Technologies, Inc., Los Angeles, CA (US)

( * ) Notice: Subject to any disclaimer, the term of this patent is extended or adjusted under 35 U.S.C. 154(b) by 23 days.

(21) Appl. No.: 17/238,686

(22) Filed: Apr. 23, 2021

(65) Prior Publication Data
US 2021/0237780 A1 Aug. 5, 2021

Related U.S. Application Data

(63) Continuation of application No. 15/718,473, filed on Sep. 28, 2017, now abandoned.
(Continued)

(51) Int. Cl.
*B61B 13/08* (2006.01)
*B66B 9/00* (2006.01)
(Continued)

(52) U.S. Cl.
CPC ............ *B61B 13/08* (2013.01); *B61B 1/005* (2013.01); *B61B 15/00* (2013.01); *B61D 1/00* (2013.01);
(Continued)

(58) Field of Classification Search
CPC .......... B61B 13/08; B61B 1/005; B61B 1/00; B61D 3/18; B66B 9/16; G05D 1/0293
See application file for complete search history.

(56) References Cited

U.S. PATENT DOCUMENTS

| 3,954,064 A | 5/1976 | Minovitch |
| 3,999,487 A | 12/1976 | Valverde |

(Continued)

FOREIGN PATENT DOCUMENTS

| CN | 101823488 | 9/2010 |
| DE | 4106231 | 9/1991 |

OTHER PUBLICATIONS

International Search Report and Written Opinion in related Application No. PCT/US17/54046 dated Jan. 2, 2018.
(Continued)

*Primary Examiner* — Scott A Browne
(74) *Attorney, Agent, or Firm* — SEYFARTH SHAW LLP

(57) ABSTRACT

A modular loading and unloading system for a high-speed transportation system, the system including an airlock loading zone, at least one airlock arranged in the airlock loading zone and connecting the airlock loading zone to a transportation tube of the high-speed transportation system. The airlock loading zone is configured to receive a plurality of capsules, payloads, and/or cars, and is operable to arrange the plurality of capsules, payloads, and/or cars for insertion into a high-speed transportation vehicle arranged in the airlock.

20 Claims, 19 Drawing Sheets

Related U.S. Application Data

(60) Provisional application No. 62/500,735, filed on May 3, 2017, provisional application No. 62/471,773, filed on Mar. 15, 2017, provisional application No. 62/400,913, filed on Sep. 28, 2016.

(51) Int. Cl.
  *B61B 15/00* (2006.01)
  *B61B 1/00* (2006.01)
  *B61D 1/00* (2006.01)
  *B61D 3/18* (2006.01)
  *B66B 9/16* (2006.01)
  *G05D 1/02* (2020.01)

(52) U.S. Cl.
  CPC ............... *B61D 3/18* (2013.01); *B66B 9/003* (2013.01); *B66B 9/16* (2013.01); *G05D 1/0293* (2013.01)

(56) References Cited

U.S. PATENT DOCUMENTS

| | | |
|---|---|---|
| 4,023,500 A | 5/1977 | Diggs |
| 4,881,469 A | 11/1989 | Hirtz |
| 5,282,424 A | 2/1994 | O'Neill |
| 5,653,175 A | 8/1997 | Milligan |
| 5,950,543 A | 9/1999 | Oster |
| 6,374,746 B1 | 4/2002 | Fiske |
| 9,090,170 B2 | 7/2015 | Mashinsky |
| 2006/0233616 A1 | 10/2006 | Friedmann |
| 2009/0101040 A1 | 4/2009 | Yang |
| 2010/0083864 A1 | 4/2010 | Flynn |
| 2013/0125778 A1 | 5/2013 | LaCabe |
| 2014/0261054 A1 | 9/2014 | Oster |
| 2014/0338557 A1 | 11/2014 | Zhou |
| 2016/0121908 A1 | 5/2016 | Ahmad |
| 2016/0229416 A1* | 8/2016 | Bambrogan ............ B61L 27/04 |
| 2016/0229646 A1 | 8/2016 | Giegel et al. |
| 2016/0230899 A1 | 8/2016 | Cothern et al. |
| 2016/0325759 A1 | 11/2016 | Pirli |
| 2017/0197639 A1* | 7/2017 | Miller .................... B61B 13/08 |

OTHER PUBLICATIONS

Screen captures from YouTube video clip entitled "ET3-Overview," 1 pages, uploaded on Apr. 12, 2013 by user "Daryl Oster". Retrieved from Internet: <https://www.youtube.com/watch?v=9UzlDe--Ofo>. (Year: 2013).

Screen captures from YouTube video clip entitled "Future of Maglev: Evacuated Tube Transport-Space Travel on Earth," 2 pages, uploaded on Oct. 20, 2014 by user "PBD Ind.". Retrieved from Internet:<https://www.youtube.com/watch?v=9y_XMwAOfJO>. (Year: 2014).

Screen captures from YouTube video clip entitled "Future Transport: Tube Travel is REAL," 1 pages, uploaded on Jan. 19, 2015 by user "10 Reasons Why Show.". Retrieved from Internet: <https://www.youtube.com/watch?v=t3aC-9PBM5k>. (Year: 2015).

Screen captures from YouTube video clip entitled "Daryl Oster—Speedy Travel in a Vaccuum Tube," 1 page, uploaded on Aug. 25, 2015 by user "ideacity". Retrieved from Internet: ,https:www.youtube.com/watch?v=QaYYL8NUpbA.. (Year: 2015).

* cited by examiner

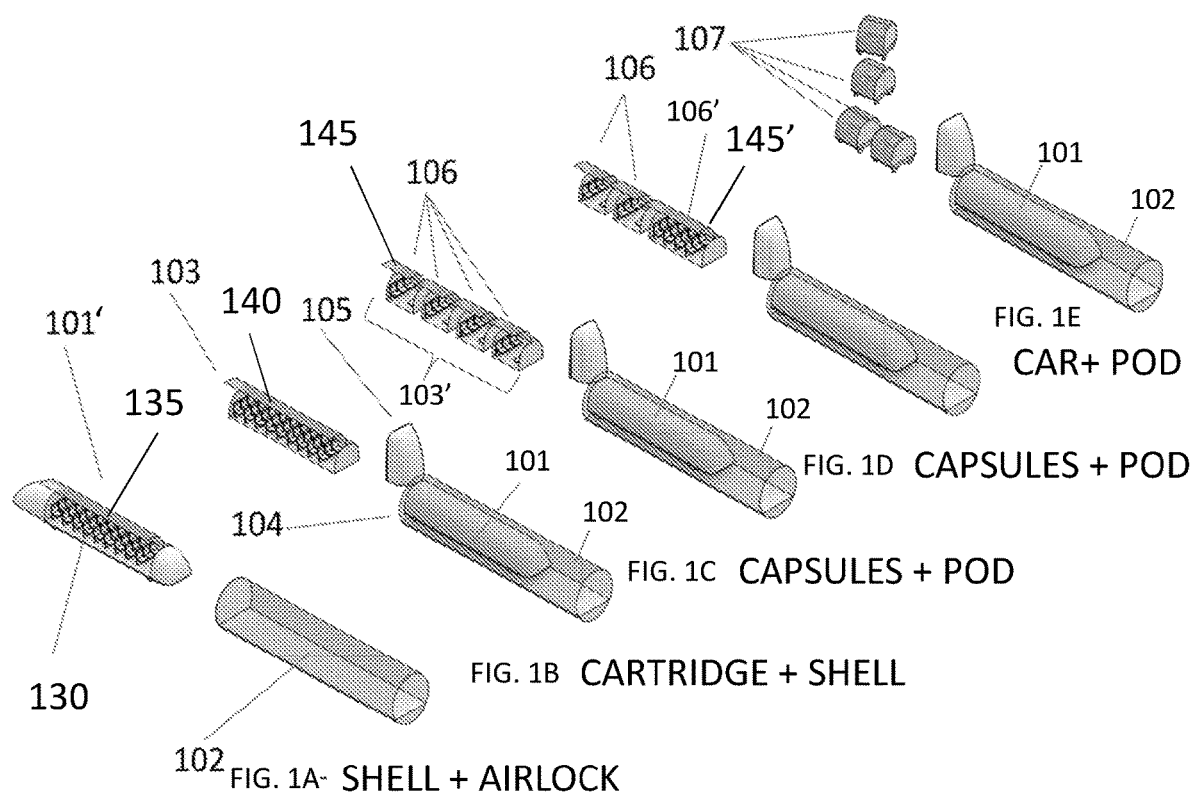

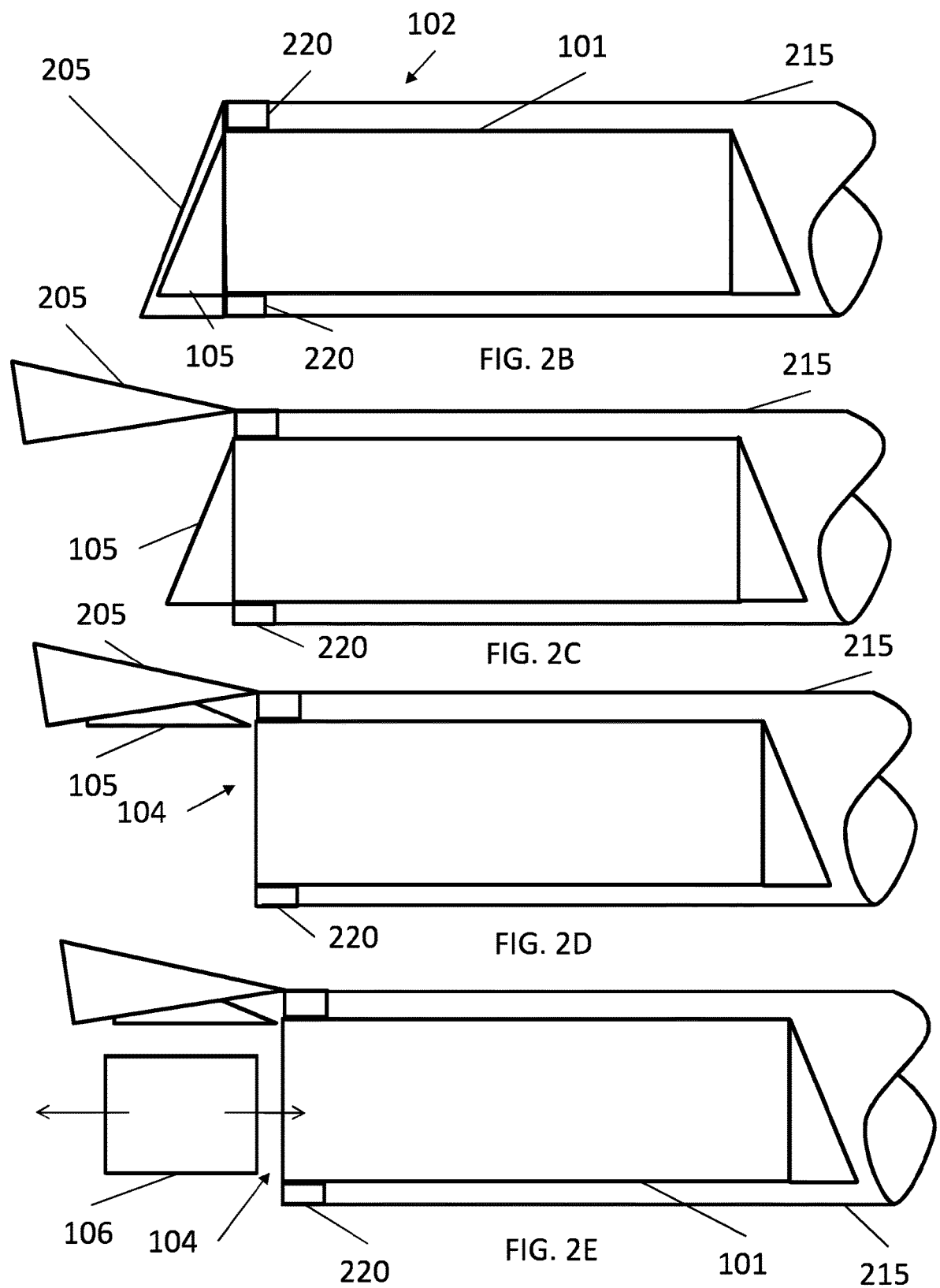

LOADING/UNLOADING SYSTEM AND VEHICLE INTERFACE FOR A TRANSPORTATION SYSTEM AND METHODS OF USE

CROSS-REFERENCE TO RELATED APPLICATIONS

This is a continuation of U.S. application Ser. No. 15/718,473, filed on Sep. 28, 2017, which claims the benefit of U.S. Provisional Application No. 62/400,913, filed Sep. 28, 2016, U.S. Provisional Application No. 62/471,773, filed Mar. 15, 2017, and U.S. Provisional Application No. 62/500,735, filed May 3, 2017. The entire disclosure and contents of each of these applications are hereby incorporated by reference herein in its entirety.

BACKGROUND OF THE DISCLOSURE

1. Field of the Disclosure

The present disclosure relates to a high-speed transportation system, and more specifically, to a loading/unloading system for a high-speed transportation system, systems and methods of loading/unloading modular elements in a high-speed transportation system, and to methods for using the high-speed transportation system.

2. Background of the Disclosure

A high-speed, high-efficiency transportation system may utilize a low-pressure environment in order to reduce drag on a vehicle at high operating speeds, thus providing the dual benefit of allowing greater speed potential (e.g., approximately 700 miles per hour) and lowering the energy costs associated with overcoming drag forces. In some embodiments, these systems may use a near vacuum environment within a tubular structure. This system has numerous benefits over conventional transportation systems, namely more frequent takeoffs (or launches) and faster transit speeds. In order to take advantage of these benefits, the time between loading of the vehicle and takeoff (or launch) should be minimized so that vehicles can be more effectively queued. This presents two issues that have not been faced by present transportation methods: rapid vehicle priming and airlock re-pressurization. Most transportation systems are loaded "on the track," e.g., trains, subways, and airplanes are boarded during a designated boarding time that is connected to the overall takeoff schedule. Delays in boarding can lead to overall systemic delays. For example, in a low-pressure transportation system, onboarding individual passengers while the transportation vehicle is on the track would negate some or all of the gains in overall system efficiency. Additionally, the depressurization of the airlock for takeoff and re-pressurization for boarding introduces another significant delay.

Thus, there is a need for an improved loading and/or unloading system and method for a high-speed transportation system.

SUMMARY OF THE EMBODIMENTS OF THE DISCLOSURE

The novel features which are characteristic of the disclosure, both as to structure and method of operation thereof together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure.

Some embodiments of the present disclosure are related to a modular high-speed transportation vehicle. In embodiments, the modular high-speed transportation vehicle comprises an outer shell and inner cartridge. The outer shell may contain the transportation apparatus, e.g., the propulsion system for moving the vehicle, such as the motor, suspension, and/or wheels. The outer shell may also contain instrumentation, such as sensor arrays. The inner cartridge comprises at least one capsule or car (or vehicle) containing the payload to be transported, e.g., people and/or cargo. The inner cartridge is structured to fit within the outer shell when the modular high-speed transportation vehicle is ready for transit. In embodiments, the single cartridge may comprise a number of cars (and/or capsules) combined together depending on, for example, the size of the payload, the destination, and/or other considerations.

Another embodiment is related to a method for loading and/or unloading cars (e.g., automobiles, trucks, vans, etc.) for a high-speed transportation system. Passengers and/or cargo are loaded into cars in a docking bay. In embodiments, the docking bays may be part of a larger elevator system that is operable to move the docking bays, for example, both horizontally and vertically, when necessary. The elevator system delivers the bay to the necessary airlock loading station. The vertical and horizontal arrangement and movement of the docking bays within the elevator system allows for loading and/or unloading of passengers and/or cargo to and from capsules (and/or loading/unloading of cars) to occur simultaneously across several floors, such that all of the capsules or cars that form the modules of a single cartridge can be loaded simultaneously, for example. This allows for queuing of capsules for easier, faster, and/or automated loading. The capsules are assembled into cartridges in the airlock loading stations, and loaded into the shell while the shell is engaged with the airlock. In accordance with aspects of the disclosure, this allows the shells to be rapidly loaded and unloaded without having to depressurize and re-pressurize the airlock, which represents significant time expenditure. The totality of this system allows for the departure of vehicles, for example, as frequent as every ten seconds, which is considerably faster than presently considered high-speed transportation systems.

Another embodiment of the present disclosure is directed to a configuration of modular cars. In an exemplary embodiment, the cars may comprise two segments: a chassis and a payload. The chassis may be universal, e.g., the chassis is operable to engage with any of a variety of payloads. In embodiments, the chassis may have both propulsion and steering elements. The propulsion may include a motor, battery, suspension, and wheels. In embodiments, the steering may be user-controlled, remotely-controlled, or autonomous. In embodiments, the payload is a container for passengers and/or cargo that engages with the chassis. The car has sufficient range to travel between discrete locations and the docking bay, or the docking bay and the airlock loading zone. The payload can be removed from the chassis where necessary, such as, in embodiments, to assemble the payload into a cartridge and to load the payload into an outer shell.

Some embodiments of the present disclosure are directed to a system for interfacing between an autonomous vehicle and a high-speed transportation system. The autonomous vehicle may load into an outer shell, such as through a hatch. The autonomous vehicle may then engage with the outer shell, such as through receiving charging capabilities for an electric autonomous vehicle and/or share travel information. The shell may then engage with the transportation system, such that the shell travels through the high-speed transportation network to the destination station of the autonomous vehicle, after which the autonomous vehicle proceeds to the final destination. In embodiments, the outer shell may be pressurized. In other embodiments, the outer shell may not be pressurized.

Further embodiments of the present disclosure are directed to method for achieving point-to-point payload delivery. A payload, such as goods and people, may have a starting location and a desired destination location. The payload may be loaded into an autonomous vehicle. The autonomous vehicle may be summoned by any of a number of known approaches, such as through an autonomous rideshare program and/or by scheduling an autonomous vehicle through a central autonomous vehicle controller. A central router (or route optimization controller), for example, may then optimize the travel path of the autonomous vehicle to deliver the payload to a desired destination. The route optimization controller may route the autonomous vehicle to a high-speed transportation system onboarding center. The autonomous vehicle may engage with the high-speed transportation system by any of a number of known approaches, such as instructing the autonomous vehicle to move through a determined route to enter an outer shell. The high-speed transportation system may then carry the autonomous vehicle to a particular destination off-boarding center that is an optimized distance from the desired final destination. While the autonomous vehicle is engaged in the high-speed transportation system, the autonomous vehicle and high-speed transportation system may communicate. This communication may include both data, such as location, speed, and destination, and physical docking, such as providing charging of electrical systems. The autonomous vehicle may then disengage with the high-speed transportation system and exit the destination station off-boarding center. The autonomous vehicle may then travel to and deliver the payload to the desired destination.

Additional embodiments of the present disclosure are directed to a system for providing optimized point-to-point payload delivery based on user input. A user may use an interface to make a request, such as a goods purchase and a restaurant reservation. A route optimization controller may evaluate the request by determining the optimal decision tree to address the request. For a goods purchase, for instance, the controller may communicate the order to a service provider, and optimize a transit route between a factory and the user. The route optimization controller may coordinate all intermediary transportation of the goods between the factory and the user, using, for example, an autonomous vehicle, air transportation, and/or a high-speed transportation system. If the route optimization controller determines, based on factors such as delivery schedule and cost, that a high-speed transportation system is necessary (or efficient), then the route optimization controller may facilitate the purchase of the necessary tickets. The controller may route the autonomous vehicle to the optimized high-speed transportation system terminal. The autonomous vehicle may engage with the high-speed transportation system, which delivers the autonomous vehicle to a terminal optimized to (e.g., relatively near to) the final destination (or pick-up point). The autonomous vehicle may then be routed to the delivery destination.

With an example, if the interface is used to make a restaurant reservation request, the request may be transmitted to the route optimization controller. The controller may then schedule an autonomous vehicle to pick up the user at their original location at a time determined to allow the user to arrive at the restaurant at the proper reservation time. If the route optimization controller determines, based on factors such as delivery schedule and cost, that a high-speed transportation system is necessary (or efficient), then the route optimization controller may facilitate the purchase of the necessary tickets for the high-speed transportation system. The controller may route the autonomous vehicle to the optimized high-speed transportation system departing terminal. The autonomous vehicle may engage with the high-speed transportation system, which may deliver it to a terminal optimized to the destination (e.g., the restaurant). The autonomous vehicle may then be routed to the restaurant.

A further embodiment is related to a method of using a high-speed transportation system for long range asset management. An economic concept called "clustering" suggests that geographical distance between and manufacturers and necessary resources is a key factor in the economic success of the region. One of the promises of an high-speed transportation system is that it can expand the clustering effect by allowing otherwise remote locations to be directly connected with minimal time delay. The aforementioned modular vehicles may be configured such that they can be used for purposes outside of transit within a substantially enclosed, controlled environment, high-speed transportation system, e.g., they may be used as general purpose cars and as part of an autonomous ride-sharing service. An autonomous car may be configured such that it may retrieve a passenger(s) and cargo in a first location, engage with the high-speed transportation system, arrive at a second location, and deliver the passenger(s) and cargo to a final destination. This configuration serves to extend the natural range of a vehicle such that it can utilize a point-to-point or network of high-speed transportation systems to travel between remote locations that would be otherwise inaccessible through the normal course of the vehicle's range and/or within a reasonable time or cost.

An additional embodiment is directed to a method of utilizing a high-speed transportation system to optimize the location of geographically remote assets in accordance with demand and/or other factors. For example, if a high-speed transportation system is connecting a city pair, a fleet of autonomous ride share vehicles may be transferred from a first city to a second city rapidly and easily if they are being underutilized in the first city and demand has risen in the second city. This has the effect of lowering the size of standby vehicles because demand can be equalized across a greater distance, and connect two otherwise geographically and economically remote regions as if they were adjacent.

Aspects of the present disclosure are directed to a modular loading and unloading system for a high-speed transportation system, the modular loading and unloading system comprising an airlock loading zone, at least one airlock arranged in the airlock loading zone and connecting the airlock loading zone to a transportation tube of the high-speed transportation system. The airlock loading zone is configured to receive a plurality of capsules, payloads, and/or cars, and is operable to arrange the plurality of capsules, payloads, and/or cars for insertion into a high-speed transportation vehicle arranged in the airlock.

In embodiments, the airlock includes a sealer structured and arranged to interact with the high-speed transportation vehicle when arranged in the airlock, such that the sealer and the high-speed transportation vehicle together provide a first air pressure barrier between a relatively lower pressure in the tube and a relatively higher pressure of the airlock loading zone.

In further embodiments, the airlock further includes an airlock door structured and arranged to provide a second air pressure barrier between the relatively lower pressure in the tube and the relatively higher pressure of the airlock loading zone.

In additional embodiments, system further comprises a first pressure sensor arranged in the tube for quantifying a pressure in the tube, a second pressure sensor arranged adjacent the airlock door for quantifying a pressure in a region between the airlock door and the first pressure barrier, and a third pressure sensor in the airlock loading zone for quantifying a pressure in the airlock loading zone.

In yet further embodiments, the system further comprises a pump structured and arranged for increasing and decreasing pressure in the region between the airlock door and the first pressure barrier.

In embodiments, the high-speed transportation vehicle includes an outer shell door, which provides access to a payload area of the high-speed transportation vehicle when opened.

In embodiments, the system further comprises an airlock controller operable to control operation of the pump based on a pressure in the region between the airlock door and the first pressure barrier, and operable to control opening and closing of the airlock door and the outer shell door.

In further embodiments, the system further comprises a loading bay configured for receiving the plurality of cars and/or payloads, and/or configured for loading and unloading of passengers and/or cargo into a plurality of the capsules.

In additional embodiments, the system further comprises an elevator system arranged between the loading bay and the airlock loading zone, and configured to move the plurality of cars, payloads, and/or capsules between the loading bay and the airlock loading zone.

In yet further embodiments, the elevator system is operable to move the cars, payloads, and/or capsules vertically and/or horizontally.

In some embodiments, the cars comprise modular cars having a respective payload that is removeably attachable to a chassis.

In further embodiments, the airlock loading zone includes an automated guided vehicle system operable to move the capsules, payloads, and/or cars.

Additional aspects of the present disclosure are directed to a method of operating a modular loading and unloading system for a high-speed transportation system. The method comprises receiving a plurality of capsules, payloads, and/or cars in an airlock loading zone having at least one airlock connecting the airlock loading zone to a transportation tube of the high-speed transportation system, arranging the plurality of capsules, payloads, and/or cars for insertion into a high-speed transportation vehicle arranged in an airlock, and inserting the plurality of capsules, payloads, and/or cars into the high-speed transportation vehicle, while the high-speed transportation vehicle is arranged at least partially in the airlock. The airlock includes a sealer structured and arranged to interact with an outer shell of the high-speed transportation vehicle when arranged in the airlock, such that the sealer and the high-speed transportation vehicle together provide a first air pressure barrier between a relatively lower pressure in the tube and a relatively higher pressure of the airlock loading zone.

In embodiments, the method further comprises moving the plurality of capsules, payloads, and/or cars to the airlock loading zone from a loading bay, wherein the moving comprises using one or more elevators.

In further embodiments, the method further comprises onboarding passengers in a parallel manner into respective capsules arranged in a loading bay, wherein the respective capsules are designated for transport in a particular high-speed transportation vehicle and moving the respective capsules to the airlock loading zone. The arranging the plurality of capsules for insertion into a high-speed transportation vehicle comprises arranging the respective capsules into a linearly arranged cartridge for serial loading into the particular high-speed transportation vehicle.

In additional embodiments, the cars comprise modular cars each having a respective payload and a respective chassis, and the method further comprises receiving the modular cars at a loading bay, detaching the respective payloads from the respective chasses, and moving the payloads to the airlock loading zone.

In yet further embodiments, the cars comprise conventional cars, and the method further comprises receiving the cars at a loading bay and moving the cars to the airlock loading zone.

In embodiments, the high-speed transportation vehicle includes an outer shell door, and wherein the airlock includes an airlock door, the method further comprising closing the outer shell door and closing the airlock door after the inserting.

In embodiments, the method further comprises lowering a pressure in a region between the shell door and the first pressure barrier so as to equalize the pressure in the region with a pressure within the tube of the high-speed transportation system.

In further embodiments, the arranging the plurality of capsules, payloads, and/or cars is based on at least one of destination, high-speed transportation vehicle availability, a size of the capsules, payloads, and/or cars, and a current queue.

In additional embodiments, the sealer comprises at least one O-ring seal with an outer diameter approximating an inner diameter of the tube, and an inner diameter approximating an outer perimeter of the high-speed transportation vehicle.

In yet further embodiments, the method further comprises receiving the high-speed transportation vehicle at the airlock, engaging the outer shell of the high-speed transportation vehicle with the sealer to provide the air pressure barrier between the relatively lower pressure in the tube and the relatively higher pressure of the airlock loading zone, raising the pressure in a region between a shell door of the high-speed transportation vehicle and an airlock door of the airlock so as to equalize the pressure in the region with a pressure in the airlock loading zone, opening the airlock door and opening the shell door to provide an egress from an interior of the high-speed transportation vehicle, and unloading the plurality of capsules, payloads, and/or cars from the interior of the high-speed transportation vehicle.

Further aspects of the present disclosure are directed to a method of extending a range of a car. The method comprises traveling in the car from a starting point to a departure high-speed transportation system station, operating the modular loading and unloading system to load the car into the high-speed transportation vehicle, traveling in the car arranged in the high-speed transportation vehicle via the high-speed transportation system from the departure high-speed transportation system station to an arrival high-speed transportation system station, disembarking the car from the high-speed transportation vehicle, and traveling in the car from the arrival high-speed transportation system station to a final destination.

In some embodiments, the car is an autonomous vehicle.

In further embodiments, the car is an electric vehicle or a plug-in hybrid vehicle, the method further comprising charging a battery of the car while the car is arranged in the high-speed transportation vehicle.

In additional embodiments, the method further comprises providing wireless internet access to the car while the car is arranged in the high-speed transportation vehicle.

Aspects of the present disclosure are directed to a method for long-range asset management of a fleet of cars. The method comprises determining a current utilization of the fleet of cars in a first location, determining an anticipated demand for the fleet of cars in the first location, determining a current utilization of cars in a second location, determining an anticipated demand for the cars in the second location, determining a reallocation of at least a portion of the fleet of cars in the first location to the second location based upon at least one of the current utilization of the fleet of cars in the first location, the anticipated demand for the fleet of cars in the first location, the current utilization of cars in the second location, and the anticipated demand for cars in the second location, moving the portion of the fleet of cars from the first location to a departure high-speed transportation station, operating the modular loading and unloading system to load the cars into the high-speed transportation vehicle, moving the cars from the departure high-speed transportation station to an arrival high-speed transportation station via the high-speed transportation system, unloading the cars from the high-speed transportation vehicle, and moving the cars from the arrival high-speed transportation station to the second location.

BRIEF DESCRIPTION OF THE DRAWINGS

These and other features of this disclosure will be best understood by reference to the following detailed description of a preferred embodiment of the disclosure, taken in conjunction with the accompanying drawings, in which:

FIGS. 1A-1E depict various configurations of capsules, cars, and cartridges in accordance with aspects of the disclosure;

FIG. 2A-2F depict an airlock loading zone assembly and operation thereof in accordance with aspects of the disclosure;

DETAILED DESCRIPTION OF THE EMBODIMENTS OF THE DISCLOSURE

Figure 2A:
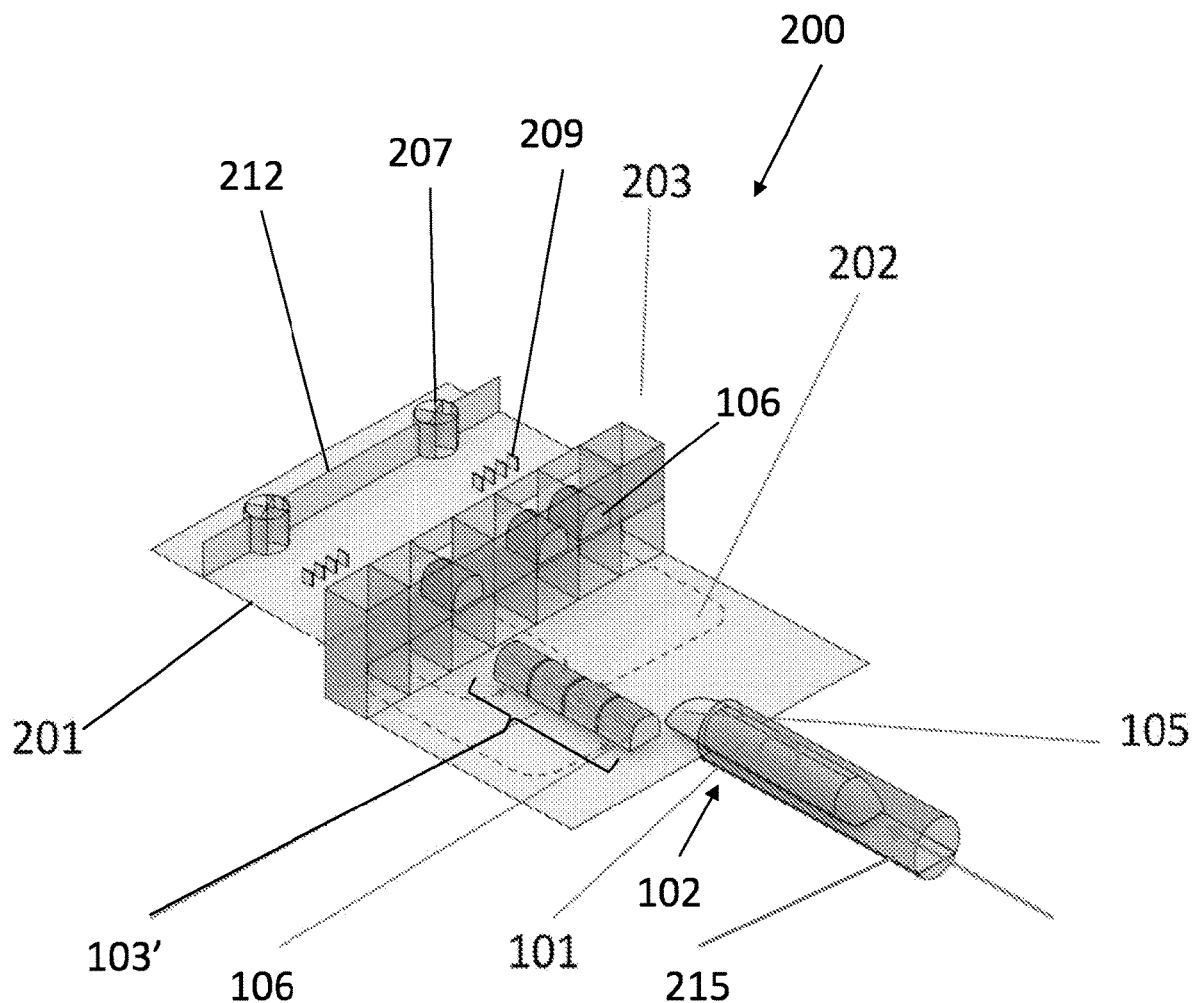

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also indicate that mixtures of one or more magnetic materials can be present unless specifically excluded. As used herein, the indefinite article "a" indicates one as well as more than one and does not necessarily limit its referent noun to the singular.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" indicates "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of," so that for instance "a composition comprising a compound A" may also (essentially) consist of the compound A.

The various embodiments disclosed herein can be used separately and in various combinations unless specifically stated to the contrary.

Embodiments of the present disclosure may be used in a high-speed transportation system, for example, as described in commonly-assigned application Ser. No. 15/007,783, titled "Transportation System," the contents of which are hereby expressly incorporated by reference herein in their entirety.

Modular Loading/Unloading System for a High-Speed Transportation System

Aspects of the disclosure are directed to a modular loading/unloading system for a high-speed transportation system. In embodiments, the high-speed transportation vehicles are loaded into a low-pressure environment via an airlock for travel in the high-speed transportation system. In embodiments, the high-speed transportation vehicles may include an outer shell and at least one inner cartridge arrangeable in the outer shell. In accordance with aspects of the disclosure, the outer shell is the pod or high-speed transportation vehicle configured to traverse the low-pressure transportation system, and the inner cartridge comprises one or more capsules (e.g., configured for cargo and/or human passengers) or vehicles configured for transport in the outer shell. FIGS. 1A-1E show several configurations of the outer shell, the inner cartridges, and the airlock system in accordance with aspects of the disclosure.

FIG. 1A shows an exploded view of an exemplary and non-limiting high-speed transportation vehicle 101' configured with a passenger accommodation area 130 and a schematically-depicted airlock 102, wherein the high-speed transportation vehicle 101' is not arranged in the airlock 102. In contrast to the modular high-speed transportation vehicles discussed below, with this exemplary embodiment, the passenger accommodation area 130 is not a modular component arrangeable in the high-speed transportation vehicle 101', but rather is a part of the high-speed transportation vehicle 101'. As such, with this exemplary embodiment passengers directly board the high-speed transportation vehicle 101' "on the track," which occurs outside of the airlock 102. Once all of the passengers are boarded into the high-speed transportation vehicle 101', the vehicle door 135 is closed, and the high-speed transportation vehicle 101' may be loaded into the airlock 102 for travel in the high-speed transportation tube.

This arrangement, however, may cause delays in loading and/or launching of the high-speed transportation vehicle. For example, as noted above, in order to take greater advantage of the benefits of a high-speed transportation system, the time between loading of the vehicle and takeoff (or launch) should be minimized so that vehicles can be more effectively queued. For example, in a low-pressure transportation system, boarding on the track may negate some or all of the pins in overall system efficiency. Additionally, the depressurization of the airlock for takeoff and re-pressurization for boarding may introduce further significant delay. Moreover, delays in boarding can lead to overall systemic delays.

FIG. 1B depicts a modular loading system in accordance with aspects of the disclosure, wherein a modular cartridge 103 may be arranged in (and extracted from) the outer shell 101, while the shell 101 remains partially arranged in the airlock 102. As such, with this embodiment, the passengers can be loaded into a passenger accommodation area while not "on the track." As shown in FIG. 1B, the cartridge 103 is configured in this embodiment to accommodate passengers and includes a cartridge door 140 for ingress to and egress from the cartridge 103. In accordance with aspects of the disclosure, the shell 101 is contained substantially within the airlock 102. As shown in FIG. 1B, while the shell 101 substantially abuts the airlock entrance 104, the arrangement is configured to maintain a seal to maintain a low-pressure environment in the airlock 102, while the shell door 105 is operable to open (and close), allowing ingress of the cartridge 103 into the shell 101. As discussed below, with such an arrangement the time and/or energy for depressurization of the airlock for takeoff and re-pressurization for boarding may be reduced so as to minimize any delay.

FIG. 1C depicts a different configuration of a cartridge 103', wherein the cartridge 103' comprises of a plurality of modular capsules 106. These capsules 106 are configured to fit within the shell 101. The capsules 106 can be configured to accommodate passengers, as shown, or cargo, or an assortment of either, and include capsule doors 145 for ingress to and egress from the capsule 106. As shown with capsule 106' in FIG. 1D, the capsules can be of different lengths (with capsule doors 145' of corresponding length), so long as the plurality of selected capsules fit within the shell 101. In accordance with aspects of the disclosure, by utilizing modular capsules 106, a plurality of modular capsules 106 may be loaded (e.g., with passengers) simultaneously, and then the modular capsules 106, once loaded, can be arranged into a cartridge 103' for insertion into an outer shell, which provides greater efficiencies when loading the capsules. Moreover, such an arrangement allows for real-time adjustments to cartridge configurations for a particular trip. For example, if one passenger is delayed in boarding a modular capsule 106, then that particular modular capsule 106 can be delayed, while other modular capsules 106 can be sent. In contrast, if one passenger is delayed in boarding cartridge 103, then the entire cartridge 103 could be delayed from a scheduled departure. Thus, utilizing modular capsules 106 instead of "full size" cartridges 103 may provide greater efficiencies in the loading and launching processes.

FIG. 1E depicts another exemplary embodiment of the loading/unloading system, in which modular cars 107 are loadable into the outer shell 101 while the shell 101 is engaged within the airlock 102. The modular vehicles (or cars) 107 can take several forms, such as but not limited to, autonomously-controlled cargo containers or cars, user-driven cars, cars on a conventional rail, or any vehicle with propulsion and control. In embodiments, the modular vehicles 107 (e.g., once assembled into a cartridge and/or once loaded into a shell 101) can connect to each other and/or to the shell 1010 (e.g., electrically and/or communicatively).

FIG. 2A schematically depicts an exemplary method and system 200 for loading capsules 106 (and/or modular vehicles (or cars)). For example, as shown in FIG. 2A, the capsules 106 (a group of which together may form a cartridge 103) may be loaded in a loading bay 201. Loading may include onboarding of passengers and/or cargo into the capsules 106. For example, passengers (not shown) may pass through an entrance 207 in a security barrier 212, which, in embodiments, may include security screening and/or checking identification, and be directed to a particular queue (e.g., defined by line separators 209) to board a selected (or designated) capsule 106 arranged in the loading bay 201 (e.g., in an elevator cabin on the loading bay level).

The loading bay 201 is operable to transport the capsules 106 (and/or cars 107) horizontally and/or vertically (for example, using an elevator system 203, e.g., a horizontal/vertical elevator) to an airlock loading zone 202. For example, as depicted in the schematic exemplary arrangement, the loading bay 201 is located on a first level (e.g., an upper level), and the one or more airlock loading zones 202 may be arranged on one or more second levels (e.g., lower levels). Passengers may enter the capsules 106 while the capsule is arranged in a particular elevator cabin of the elevator system 203. Once a capsule 106 is loaded, the elevator system 203 is operable to move the capsule 106 from the loading bay 201 to the airlock loading zone 202.

Once in the airlock loading zone 202, the capsules 106 (and/or cars 107) may be assembled or formed together into a cartridge 210. In embodiments, the capsules 106 may operate as automated guided vehicles (e.g., controlled by an automated guided vehicle controller) while within the loading bay 201 and/or the airlock loading zone 202. An automated guided vehicle or automatic guided vehicle (AGV) is a vehicle that follows markers or wires in the floor, and/or uses vision, magnets, and/or lasers for navigation, such that the vehicle is autonomously moved from point A to point B (or from an origination point to one of multiple destination points). For example, the airlock loading zone may be configured to selectively move each of the capsules 106 autonomously, such that capsules 106 exiting from different bays the elevator system 203 can quickly and efficiently be grouped and aligned into a cartridge 103' for loading into an outer shell 101.

In such a manner, the capsules 106 may be grouped into a cartridge 103' and loaded into an outer shell 101. Assembly (or grouping) of the capsules 106 and/or cars 107 into a cartridge 103' may be based, for example, on measurable factors, such as destination, queuing, size, and/or availability. The assembled cartridge 103' is then directed to enter the shell 101 through the shell door 105 while the shell 101 is engaged with the airlock 102. Alternatively, a "full size" cartridge (see, e.g., FIG. 1B) may be used instead of the assembled cartridge 103' (wherein an elevator system may be sized to accommodate the larger "full size" cartridge). Once the assembled cartridge 103', for example, is loaded in the shell 101, the entirety of the shell 101 (e.g., any portion not already arranged in the airlock 102) is moved into the airlock 102 (or in other contemplated embodiments, the airlock is otherwise established around the entire shell 101), and the shell 101 is subsequently launched into the tube 215 of the low-pressure, high-speed transportation system. While FIG. 2A depicts only one tube 215 of the low-pressure, high-speed transportation system, it should be understood that the airlock loading zone may have multiple tubes 215 for entry into a low-pressure, high-speed transportation system (e.g., as entry points to different routes of a low-pressure, high-speed transportation system). Additionally, while in embodiments the high-speed transportation stations provide for ingress and egress of passengers and/or vehicles, the disclosure contemplates that a particular high-speed transportation station may be an intermediate station (e.g., a switching station) in a travel path that may not be arranged to load or unload passengers from the capsule. For example, a switching station may be arranged to receive high-speed transportation vehicles, unload the capsules therefrom into the airlock loading zone, and then reload, for example, some the capsules into a different high-speed transportation vehicle for travel to a different destination. As with such embodiments, no passengers or cargo may be unloaded from the capsules, such embodiments may not include a loading bay.

FIGS. 2B-2E schematically depict an exemplary system for loading capsules 106 and/or modular vehicles (or cars) 107 (which may be assembled together into a cartridge) into an outer shell 101, while maintaining a low-pressure environment in the tube 215. As shown in FIG. 2B, an outer shell 101 has arrived at the airlock 102 via a tube 215 of the low-pressure transportation system. As shown in FIG. 213, the airlock 102 includes a sealer 220 (e.g., at least one o-ring seal) arranged at the end of the tube 215, which is structured and arranged to cooperate with the outer shell 101 so as to seal off the low-pressure environment of the tube 215. In embodiments, the sealer 220 may comprise rubber, plastic or other polymer, composite materials, and combinations thereof. While only one sealer 220 is schematically depicted in the exemplary sematic depiction, it should e understood that a plurality of scalers 220 may be utilized to increase the effectiveness of the seals and/or to create redundancy.

As shown in FIG. 2B, with this exemplary embodiment, the airlock 102 also includes a selectively closeable door 205, which when closed, is operable to maintain the low-pressure environment within the tube 215. For example, when no outer shell 101 is present at the airlock 102, the airlock door 205 is operable to maintain the low-pressure environment within the tube 215. When the outer shell 101 is positioned as shown in FIG. 2B, however, the sealer 220 and the outer shell 101 together are operable to create an air pressure barrier so that any loss of the low-pressure environment within the tube 215 is prevented (or minimized).

As shown in FIG. 2C, once the outer shell 101 is present at the airlock 102 and positioned adjacent the sealer 220, the enclosed volume (which is still at the low-pressure) between the airlock door 205 and the door 105 of the outer shell 101 may be increased in pressure to ambient pressure. Once pressure between the airlock door 205 and the door 105 of the outer shell 101 is equalized to a pressure (e.g., ambient pressure) in the airlock loading zone on the other side of the airlock door 205, the airlock door 205 may be opened to expose door 105 of the outer shell 101. As shown in FIG. 2C, the outer shell 101 together with the sealer 220 form a barrier between the low-pressure environment within the tube 215 and the ambient pressure of the airlock loading zone. By implementing aspects of the disclosure, the volume that may be required to be pressurized (upon arrival of an outer shell 101) and subsequently depressurized (when the outer shell 101 is departing) is smaller than would be necessary if an entire volume surrounding an outer shell 101 where depressurized and re-pressurized. As such, by implementing aspects of the disclosure, the amount of time and energy necessary for pressurizing/depressurizing is reduced, such that the loading/unloading process of the outer shell 101 is more efficient.

As shown in FIG. 2D, the door 105 of the outer shell 101 is opened to provide access to the interior of the outer shell 101, which may also be at ambient pressure. Again, as shown in FIG. 2D, the outer shell 101 is positioned such that the sealer 220 and the outer shell 101 together are operable to maintain an air pressure barrier so that any loss of the low-pressure environment within the tube 215 is prevented (or minimized).

As shown in FIG. 2E, once the door 105 of the outer shell 101 is opened to provide access to the interior of the outer shell 101, one or more capsules 106 (and/or cars or cartridges formed thereof) may be loaded into and/or unloaded from an interior of the outer shell 101. Once the outer shell 101 is loaded with one or more capsules 106 (and/or cars or cartridges formed thereof) containing passengers and/or cargo, the shell door 105 may be closed and sealed, and then (or substantially simultaneously) the airlock door 205 may be closed and sealed, such as depicted in FIG. 2B. Subsequently, the pressure in the volume between the shell door 105 and the airlock door 205 is reduced so as to be equalized with the low-pressure environment of the tube 215 of the transportation system. Once the pressure is equalized, the outer shell 101 is ready to be launched from the airlock 102.

Figure 2F:
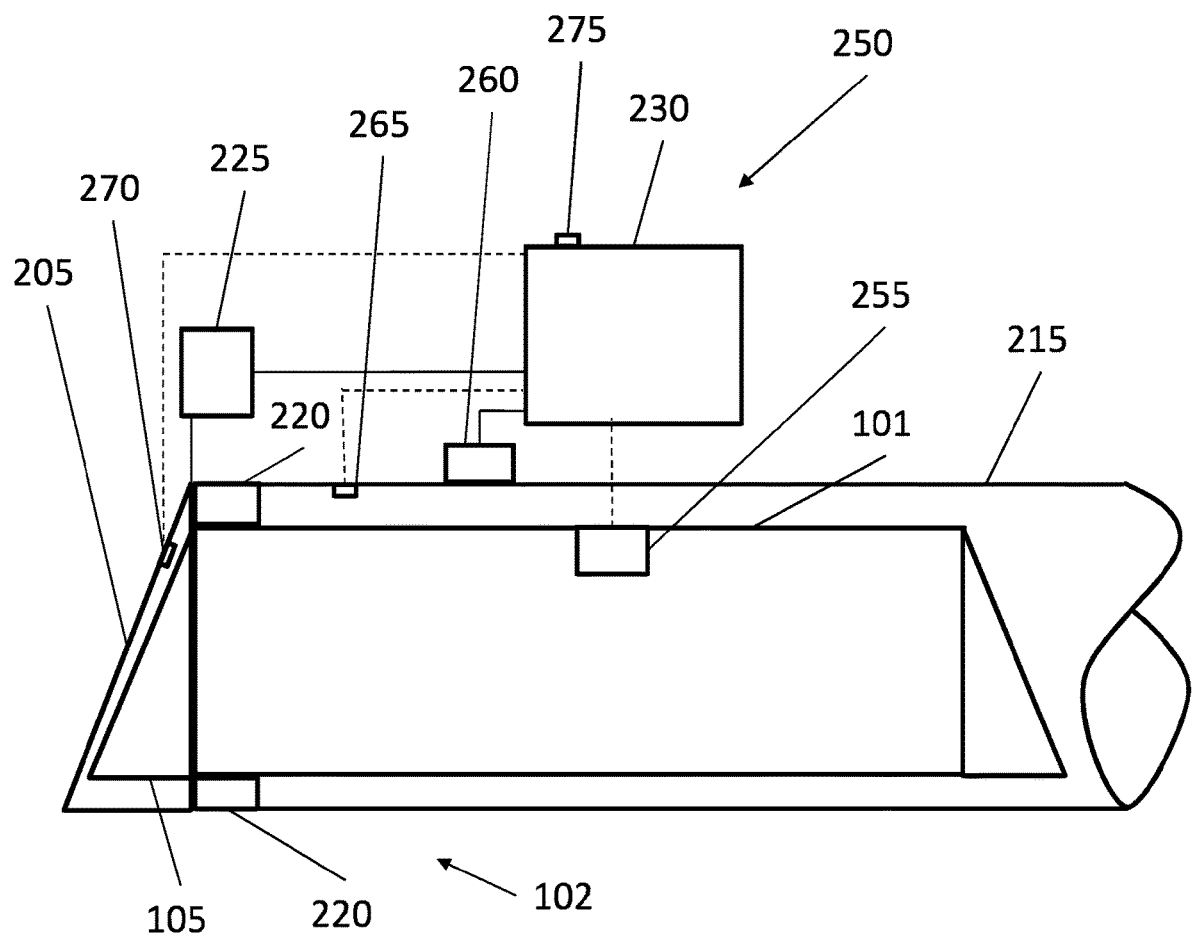

FIG. 2F schematically depicts a control system 250 for the airlock system 102 in accordance with aspects of the disclosure. As shown in FIG. 2F, the control system 250 includes a controller 230, which is operable to communicate with and control elements of the control system 250. The airlock control system 250 also includes a pump 225 operable to pressurize and depressurize the volume between the shell door 105 and the airlock door 205. With this exemplary and non-limiting embodiment, the control system 250 also includes a pressure sensor 260 arranged in the tube 215 operable to detect the pressure of the low-pressure environment, a pressure sensor 265 arranged in between the shell door 105 and the airlock door 205 operable to detect the pressure of the volume between the shell door 105 and the airlock door 205, and a pressure sensor 275 operable to detect the pressure (e.g., ambient pressure) in the airlock loading zone. As shown in FIG. 2F, each of the pressure sensors is communicatively connected (e.g., wired or wirelessly) with the controller 230. The control system 250 may also include a shell door controller 255 operable to actuate and control the opening and closing of the shell door 105 and an airlock door controller 260 operable to actuate and control the opening and closing of the airlock door 205. As shown in FIG. 2F, each of the door controllers is communicatively connected (e.g., wired or wirelessly) with the controller 230.

In accordance with aspects of the disclosure, the controller 230 is operable to control the airlock system 102 throughout the arrival, unloading, loading, and departure of the outer shell 101. For example, upon arrival of the outer shell 101 at the airlock (which may be detected using, e.g., one or more position sensors), the controller 230 is operable to control the pump 225 so as to raise the pressure in the volume between the airlock door 205 and the door 105 of the outer shell 101 (while using the pressure sensor 270 to detect the pressure in, e.g., real time) so as to equalize with the pressure in the airlock loading zone (detected using pressure sensor 275). Once the pressure is equalized with the pressure in the airlock loading zone, the controller 230 is operable to control the airlock door controller (or actuator) 260 to open the airlock door 205, and operable to control the shell door controller (or actuator) 255 to open the shell door 105. While the airlock door 205 and the shell door 105 are opened, passengers and/or cargo and/or vehicles can be unloaded and/or loaded into the outer shell 101.

Once the outer shell 101 has been unloaded and/or loaded, and is ready for door closure, the controller 230 is operable to control the shell door controller 255 to close the shell door 105, and operable to control the airlock door controller 260 to close the airlock door 205. In accordance with aspects of the disclosure, the controller 230 is operable to control the pump 225 so as to lower the pressure in the volume between the airlock door 205 and the door 105 of the outer shell 101 (while using the pressure sensor 270 to detect the pressure in, e.g., real time) so as to equalize with the low-pressure environment of the tube 215 (detected using pressure sensor 265). Once the pressure is equalized with the pressure of the low-pressure environment of the tube 215, the controller 230 stops operation of the pump 225, and the outer shell 101 is ready for departure from the airlock 102. By implementing aspects of the disclosure, the controller 230 is operable to automatically control the pump(s), and door controllers utilizing information received from the pressure sensors and position sensors to automate the airlock control and loading/unloading processes.

While not depicted in the figures, it should be understood that upon arrival of the outer shell 101 at a destination, the outer shell door on the opposite end of the outer shell 101 may interact with a similarly configured airlock system at the destination.

Figure 3:
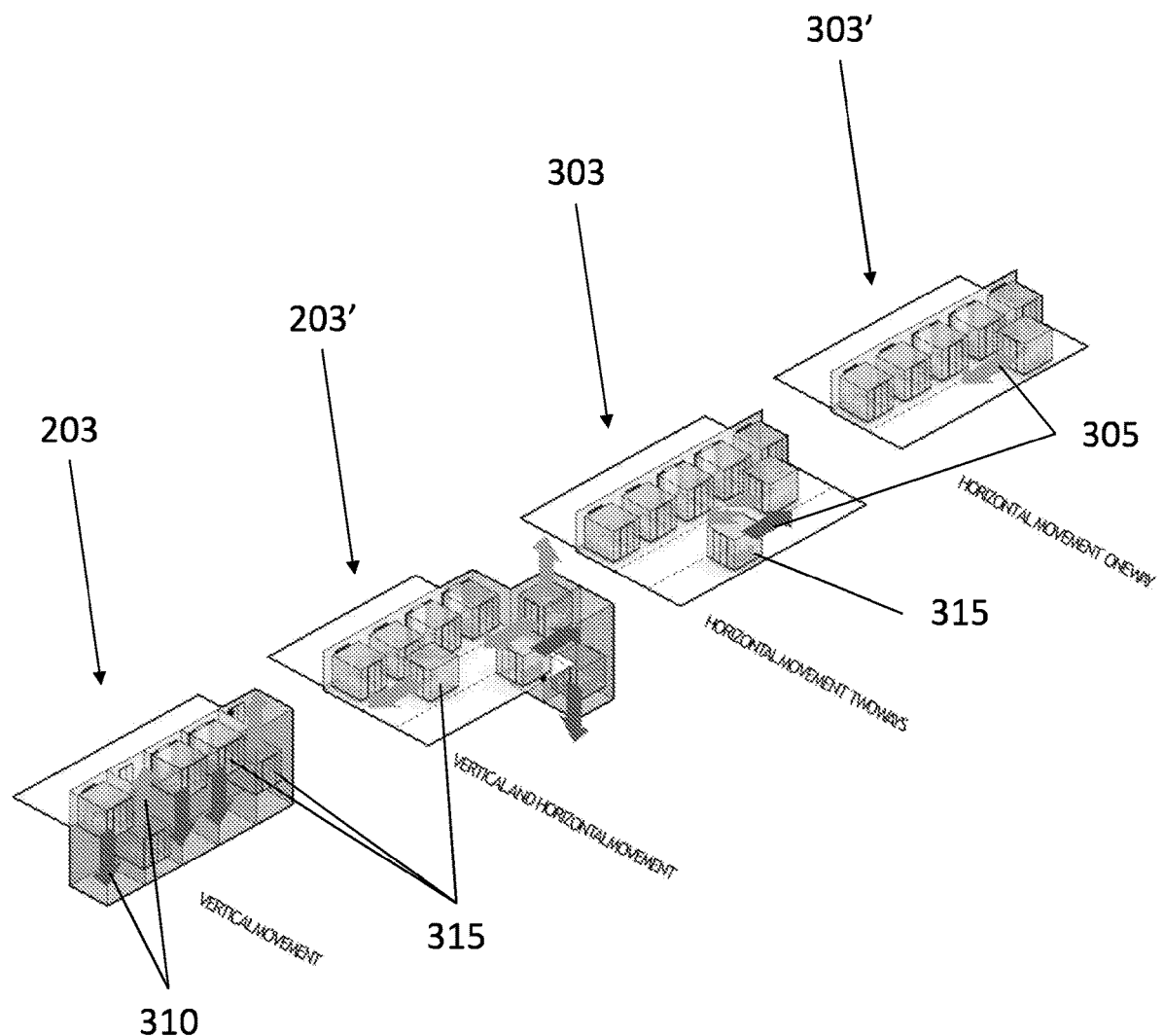
FIG. 3 depicts exemplary loading bay elevator arrangements and operations in accordance with aspects of the disclosure.

FIG. 3 schematically depicts a plurality of exemplary and non-limiting elevator systems for the movement of the modular capsules 106 (and/or vehicles 107 or portions thereof, e.g., cargo or payload compartment without wheel assembly or chassis attached thereto) within a loading bay 201 of a station. With reference to FIG. 2A, the capsules 106 may be loaded with passengers and/or cargo in variable or predetermined locations within the station depending on factors such as queuing, type of load, size, etc. The loaded capsule 106 is then moved into a particular elevator car of the elevator system and may then transported horizontally and/or vertically using the elevator system, for example, that is operable to move vertically and horizontally and or using an elevator system that is operable to move vertically in conjunction with other horizontal movers (e.g. conveyors, automated guided vehicle systems, hydraulic/pneumatic actuators, and/or horizontal elevators) to move the capsules 106 the appropriate airlock loading zone 202. In accordance with aspects of the disclosure, this allows for the contemporaneous loading of capsules 106 (and/or vehicles 107) that will be assembled into a cartridge 103' without being proximally bound. As should be understood, in embodiments, unloading of cartridges 103' may occur in the reverse order of loading (first in, last out or "FILO") or in the same order as loading (first in, first out or "FIFO").

For example, elevator system 203 is operable to move elevator cabins 315 containing respective capsules (not shown) in a vertical direction, so as to move the capsules from an upper level (e.g., the loading bay) to a lower lever (e.g., an airlock loading zone). While only two levels are depicted in the exemplary schematic depiction of FIG. 3, it should be understood that multiple levels of loading bays and/or multiple levels of airlock loading zones may be utilized, and in such embodiments, the elevator system 203 may be structured and arranged to access each of these levels.

Elevator system 203' comprises a plurality of elevator cabins 315 each operable to move capsules (not shown) in both a vertical direction and a horizontal direction, so as to move the capsules from an upper level to a lower level and also to move the capsules rightward and/or leftward. Additionally, in embodiments, each elevator cabin 315 of the elevator system 203' is configured to move a single capsule 106. Other contemplated embodiments may have elevator cabins sized to simultaneously move multiple (e.g., two or more) capsules, or a cartridge comprising multiple capsules.

While elevator system 203' is described as a vertical/horizontal elevator, it should be understood that in embodiments the horizontal movement may also be achieved using some other type of horizontal conveyor (e.g. a conveyor belt, an automated guided vehicle system). The ability of the elevator cars 315 to independently travel directionally and laterally (e.g., represented by arrows 305) supplement the ability of the elevator cars 315 of the elevator system 203 to travel vertically (e.g., represented by arrows 310). In accordance with aspects of the disclosure, by utilizing both the horizontal and vertical movers when moving the capsules (not shown) from the loading bay to a cartridge assembly region of the airlock loading zone, a more efficient loading/unloading process is achievable. For example, four capsules 106 can be simultaneously loaded in the loading bay, and then moved vertically via the elevator system 203' to the airlock loading zone and moved horizontally to arrange (e.g., align) the four capsules into a cartridge for loading into the same outer shell 101. In contrast, absent horizontal movement of the capsules, each line of capsules could only be formed with those capsules exiting the same elevator, which would necessitate those earlier loaded capsules waiting for loading the later loaded capsules before loading into the outer shell. In such a manner, by utilizing both the horizontal and vertical movers for movement of the capsules 106 from the loading bay to a cartridge assembly region of the airlock loading zone, a more efficient loading process may be achieved. As discussed above, the airlock loading zone may also utilize horizontal movers (e.g., automated guided vehicle systems or conveys) to arrange (e.g., align) the capsules into a cartridge for loading into the same outer shell 101.

Exemplary elevator system 303 comprises a plurality of horizontal elevator cabins 315 each operable to move capsules arranged therein (not shown) in a horizontal direction, so as to move the capsules (not shown) arranged therein rightward and/or leftward (e.g., two-ways). While not depicted in FIG. 3, the elevator cabins 315 of the elevator system 303 may be in a closed loop, such that an elevator cabin 315 may be loaded at a first (e.g. leftmost door, and then transported via the elevator system 303 around the loop so as to positioned at a rightmost position (i.e., a different position than the entry position) for offloading of the capsule (not shown).

Exemplary elevator system 303' comprises a plurality of horizontal elevator cabins 315 each operable to move capsules arranged therein (not shown) in a horizontal direction, so as to move the capsules arranged therein (not shown) rightward or leftward (e.g., one-way). While not shown in FIG. 3, it should be understood that combinations of the exemplary elevator systems may also be used. For example, elevator system 203 could be combined (e.g., in a serial manner) with elevator system 303 to provide both vertical and horizontal movement of capsules (not shown). For example, upon the capsules being moved vertically via elevator system 203, the capsules could be moved from elevator system 203 into elevator system 303 so as to horizontally move the capsules.

Figure 4A:
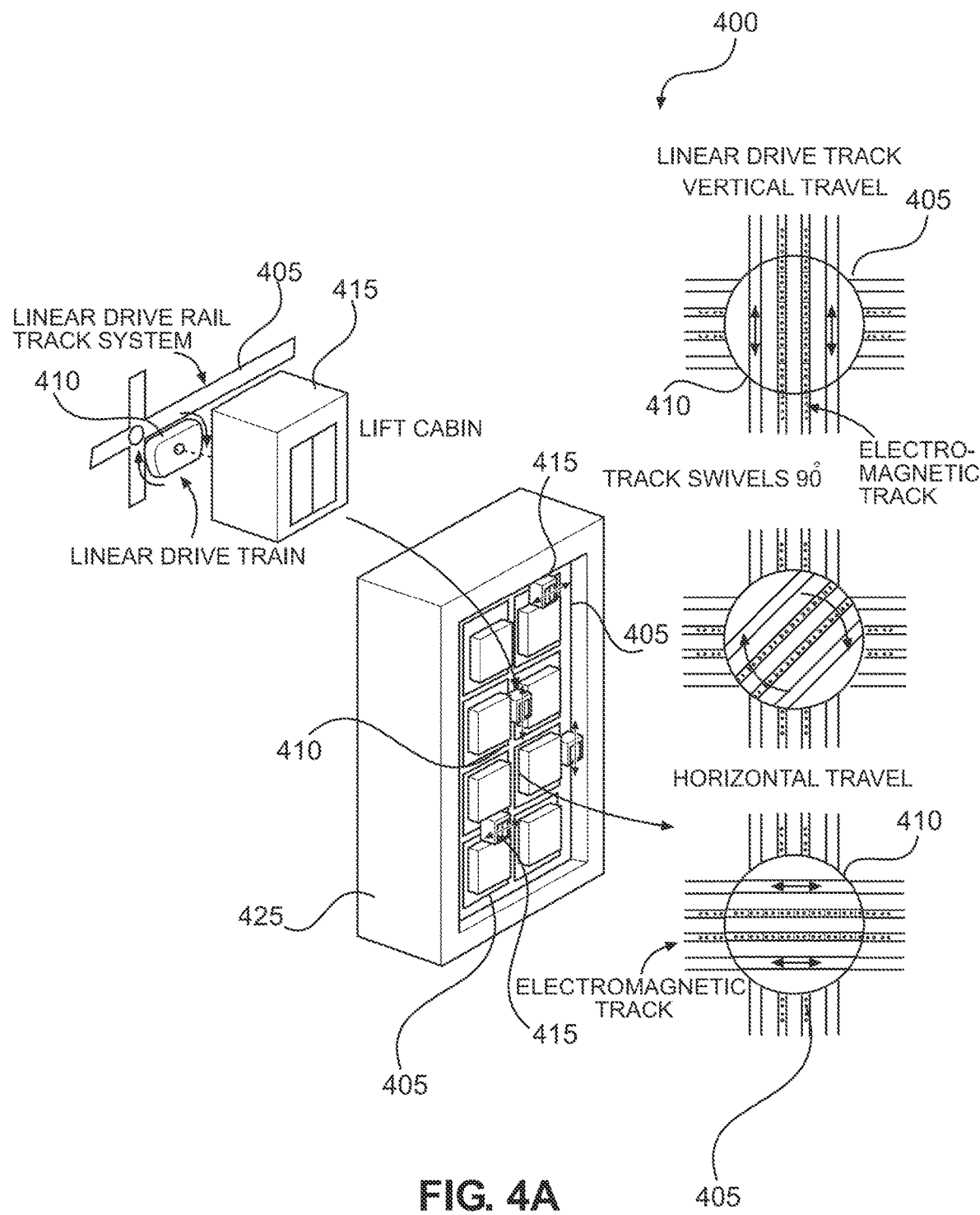
FIGS. 4A-4E depict embodiments of exemplary and non-limiting elevator systems that are operable to move both horizontally and vertically in accordance with aspects of the disclosure.

FIGS. 4A-4E depict embodiments of an exemplary and non-limiting elevator system 400 that is operable to move lift cabins 415 both horizontally and vertically in accordance with aspects of the disclosure. As shown in FIG. 4A, the elevator system 400 includes a linear drive rail track system 405, which defines one or more routes, and one or more lift cabins 415, which are operable to be driven along the linear drive rail track system 405. In embodiments, the elevator system 400 may utilize linear motors and an electromagnetic track. For example, a stator can be arranged in a track of the linear drive rail track system 405, and a linear motor can be arranged on the lift cabin 415. In other contemplated embodiments, the drive trains of the lift cabin 415 may utilize multi-propulsion and braking systems, with magnets and linear motors replacing the traditional elevator cable systems. In embodiments, the elevator system 400 may use lightweight carbon composite materials for the lift cabins 415 (and/or doors thereof) in order to reduce weight of the cabins 415.

As shown in FIG. 4A, the elevator system 400 also includes one or more rotatable track sections 410, which can be rotated (for example, using appropriate motor, e.g., servo motor) to alter the path along the linear drive rail track system 405. For example, as shown in FIG. 4A, the rotatable track section 410 can be selectively rotated from a first orientation, in which the rotatable track section 410 is arranged for vertical travel of a cabin 415 thereon, through approximately 90 degrees, such that the rotatable track section 410 is arranged for horizontal travel of a cabin 415 thereon.

As depicted in the exemplary track layout 415 of FIG. 4A, the linear drive rail track system 405 may be arranged, e.g., with intersecting loops, so that the cabin 415 may travel along both the vertical and the horizontal paths of the linear drive rail track system 405 to travel to and from a plurality of entry points, e.g., passenger entry points (not shown), for the cabins 415. While the exemplary and non-limiting track layout 415 depicts, three vertical shafts and five horizontal shafts, it should be understood that the layout may be arranged with any number of vertical shafts and/or horizontal shafts.

Figure 4B:
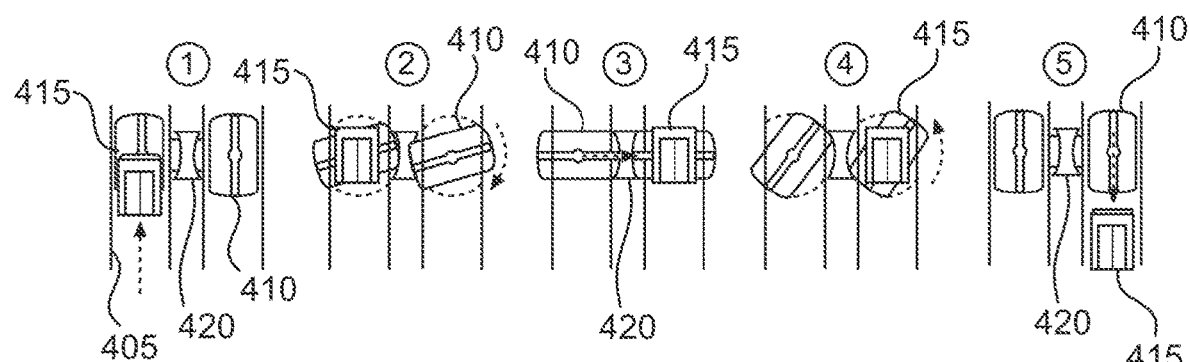

FIG. 4B depicts different rotational positions of rotatable track sections 410 as a track direction is switched from vertical to horizontal. As shown at position 1, a cabin 415 is traveling upwardly along the linear drive rail track system 405. Once the cabin 415 is raised to the level of the intersecting horizontal path, as shown in position 2, a control system is operable to rotate the rotatable track section 410 of the track the cabin 415 is traveling on, and also rotate the rotatable track section 410 of an adjacent track. As shown in position 3, the rotatable track sections 410 are rotated approximately 90 degrees (e.g., in a clockwise direction) to form, together with a bridging section 420, a horizontal path between the first vertical path and a second vertical path. As should be understood, in embodiments, the bridging section includes track elements (e.g., rails, linear motor elements, which are not shown in FIG. 4B) to facilitate movement of the cabin 415 thereon.

After the cabin 415 has been moved from the first vertical path and the second vertical path, as shown in position 4, the control system is operable to rotate the rotatable track section 410 of the track the cabin 415 is traveling on (e.g., in a counter-clockwise direction), and also rotate the rotatable track section 410 of an adjacent track to again form the first vertical path and the second vertical path. As shown at position 5, once the vertical path is reestablished, a cabin 415 is operable to travel vertically, e.g., downwardly, along the second vertical path of the linear drive rail track system 405.

Figure 4C:
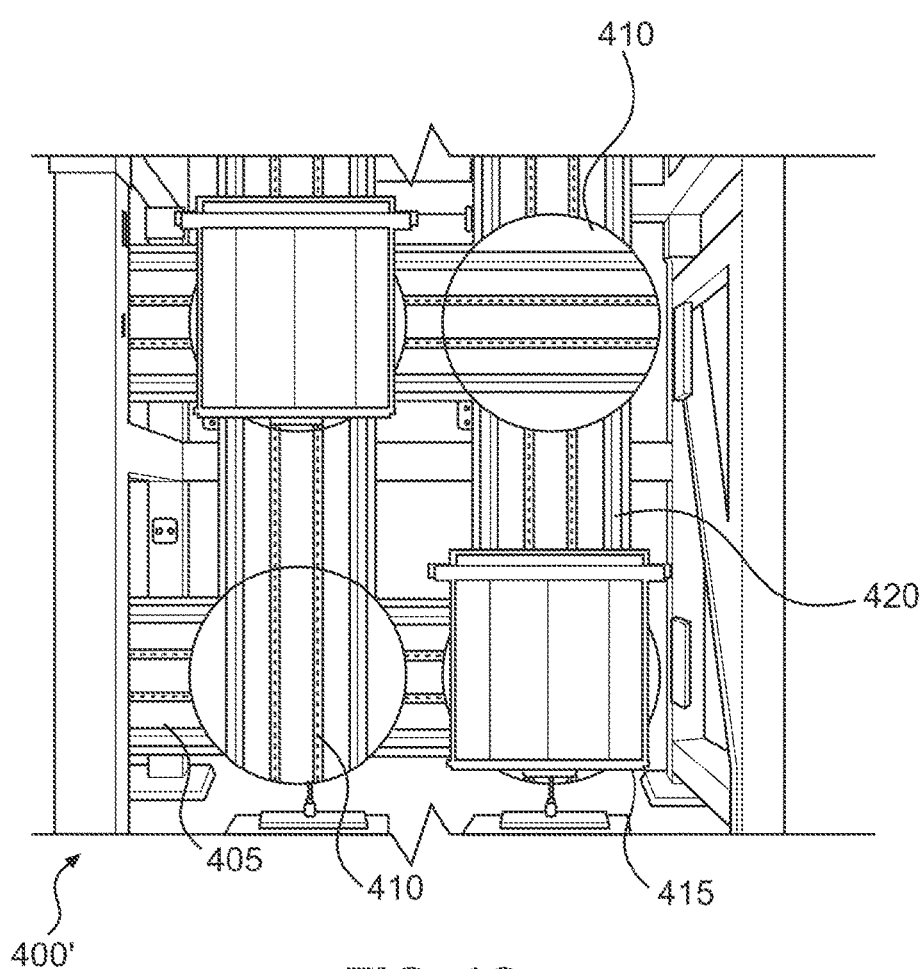

FIG. 4C shows a photograph of an exemplary and non-limiting elevator system 400' in accordance with aspects of the disclosure. As shown in FIG. 4C, the elevator system 400' includes a linear drive rail track system 405, which defines one or more routes, and one or more lift cabins 415, which are operable to be driven along the linear drive rail track system 405. FIG. 4C also shows one or more rotatable track sections 410, which are structured and arranged so as to be rotated (for example, using appropriate motor, e.g., servo motor) to alter the path along the linear drive rail track system 405, and shows a bridging section 420. As shown in FIG. 4C, the bridging section 420 includes track elements (e.g., rails, linear motor elements) to facilitate movement of the cabin 415 thereon.

Figure 4D:
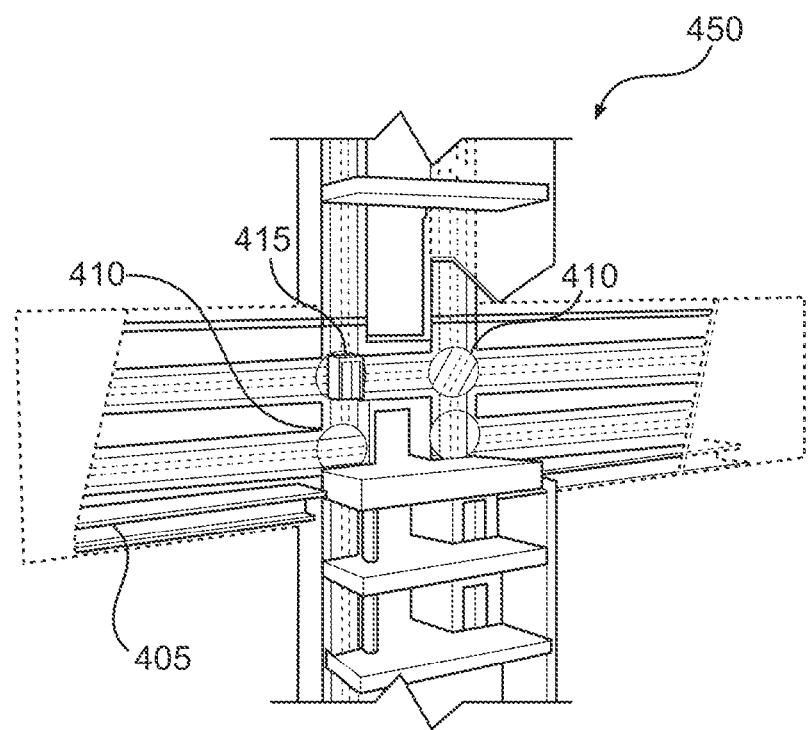

FIG. 4D shows a photograph of an exemplary and non-limiting layout of an elevator system 450 in accordance with aspects of the disclosure. With this exemplary and non-limiting layout, the linear drive rail track system 405 primarily includes tracks for the two vertical shafts, which are intersected by tracks for two horizontal shafts. As shown in FIG. 4D, the elevator system 450 includes a linear drive rail track system 405, which defines one or more routes, and one or more lift cabins 415, which are operable to be driven along the linear drive rail track system 405. FIG. 4D also shows one or more rotatable track sections 410 arranged at intersections of the vertical and horizontal paths, which are structured and arranged so as to be rotated (for example, using appropriate motor, e.g., servo motor) to alter the path along the linear drive rail track system 405.

Figure 4E:
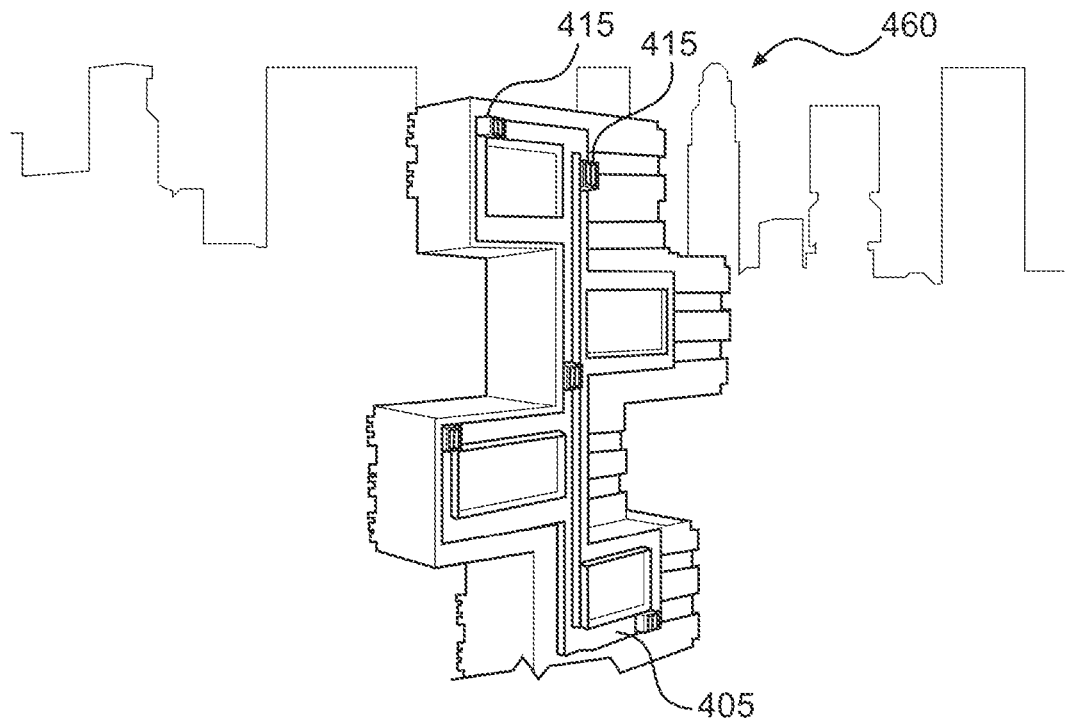

FIG. 4E shows a photograph of an exemplary and non-limiting layout of an elevator system 460 in accordance with aspects of the disclosure. With this exemplary and non-limiting layout, the linear drive rail track system 405 primarily includes tracks for the two vertical shafts, which am intersected by tracks for four "loops" of horizontal shafts and vertical shafts. As shown in FIG. 4E, the elevator system 460 includes a linear drive rail track system 405, which defines one or more routes, and one or more lift cabins 415, which are operable to be driven along the linear drive rail track system 405.

Figure 5A:
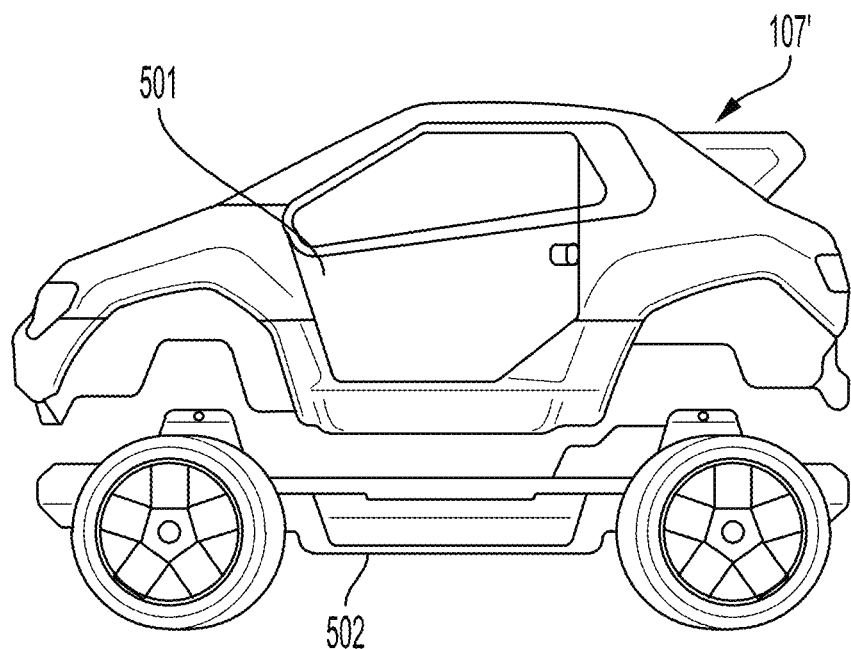
FIGS. 5A and 5B depict exemplary and non-limiting modular vehicle (or modular car) configurations in accordance with aspects of the disclosure.
Figure 5B:
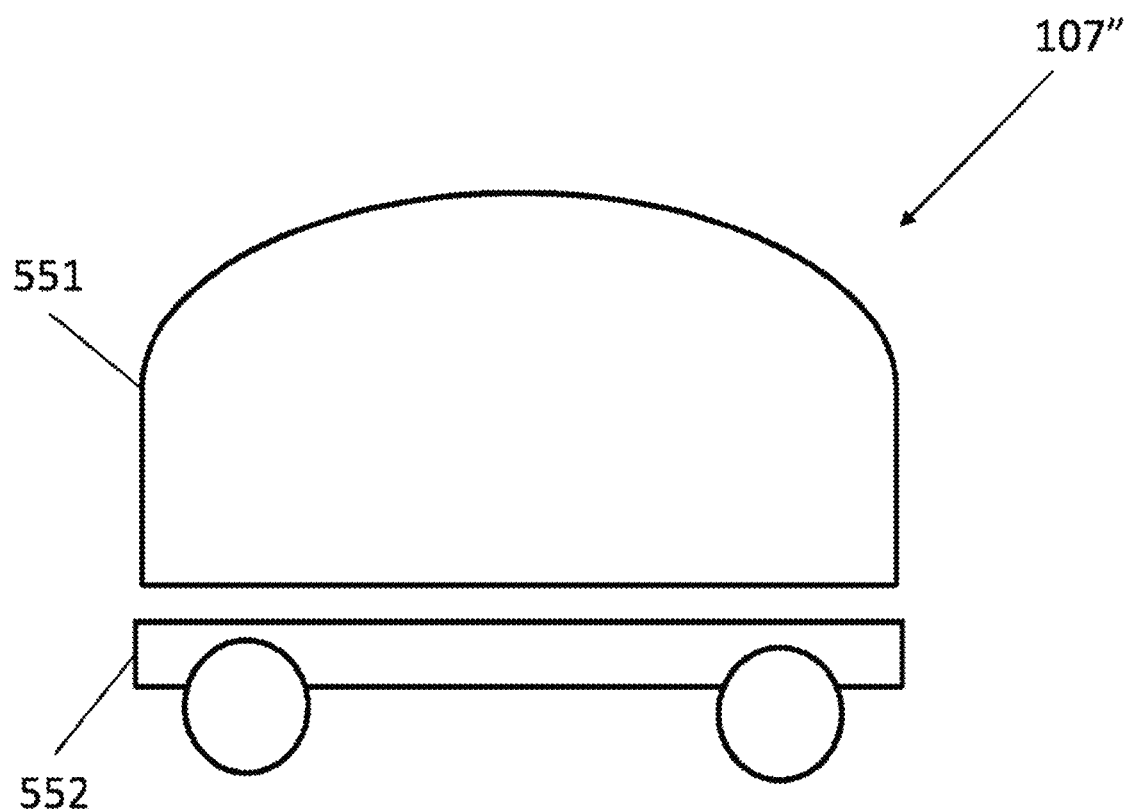

FIGS. 5A and 5B depict exemplary and non-limiting modular car (or vehicle) configurations in accordance with aspects of the disclosure. For example, as shown in FIG. 5A, in some contemplated embodiments, the modular car 107' comprises two separable portions: a payload (or payload compartment or area) 501 for accommodating a payload (e.g., passengers and/or cargo) and a chassis 502 for supporting the payload 501. For example, with a non-limiting embodiment, the payload 501 may comprise a passenger compartment, with seating, etc. and/or cargo compartments for accommodating cargo. With a non-limiting embodiment, the chassis 502 may comprise, for example, a suspension, battery, wheels, and a motor.

As schematically depicted in FIG. 5B, in some contemplated embodiments, a modular car 107'' may comprise two separable portions: a payload (or payload area) 551 for accommodating a payload (e.g., passengers and/or cargo) and a chassis 552 for supporting the payload 551. For example, with a non-limiting embodiment, the payload 551 may comprise a passenger compartment, with seating, etc. and/or cargo compartments for accommodating cargo. With a non-limiting embodiment, the chassis 552 may comprise, for example, a suspension, battery, wheels, and a motor.

In other embodiments, the car may comprise a conventional automobile, e.g., passenger vehicle. With such a conventional car, the cargo/payload compartment may not be detachable from the chassis. As such, in embodiments, the outer shell of the transportation system may be configured to accommodate either detachable payloads (e.g., payload 501 or 551) and/or complete vehicles (e.g., with their wheels or chassis not detached therefrom).

In accordance with aspects of the disclosure, the payload 501 can be independently loaded and/or unloaded while detached from a chassis 502, for example, while in the loading bay (not shown). The payload 501 can then be attached to a chassis 502, which provides the ability to move the payload 501. Furthermore, the payload 501 can be removed from the chassis 502 at a future point, for example, so as to load the chassis into the shell (not shown). The payload 501 may comprise passenger and/or cargo containers.

For example, with a contemplated embodiment, a modular vehicle 107' may arrive at a low-pressure transportation system station (e.g., driven by a passenger or autonomously driven) for onboarding into the low-pressure transportation system. Upon arrival at the station, the modular vehicle 107' may be directed to a loading bay (not shown), wherein the payload 501 is separated from the chassis 502, and the payload 501 (in a manner similar to a capsule 106) may be loaded into an appropriate outer shell 101, for travel in the low-pressure (and/or high-speed) transportation system. Upon arrival at a destination station, the payload 501 may be removed from the outer shell and connected to a different chassis 502 so as to re-form a modular vehicle 107'. In such a manner, only the payloads 501 are transported in the high-speed transportation system, which in accordance with aspects of the disclosure, reduces the weight, size, and costs of transporting.

As noted above, in additional contemplated embodiments, the car may comprise a conventional automobile, e.g., passenger vehicle, or some other vehicle, which is loaded into the outer shell while it's wheels remain attached thereto. In such a manner, in accordance with aspects of the disclosure, the vehicles do not need disassembly/reassembly (e.g., to remove the chassis therefrom) upon insertion into and removal from the outer shells.

Figure 6A:
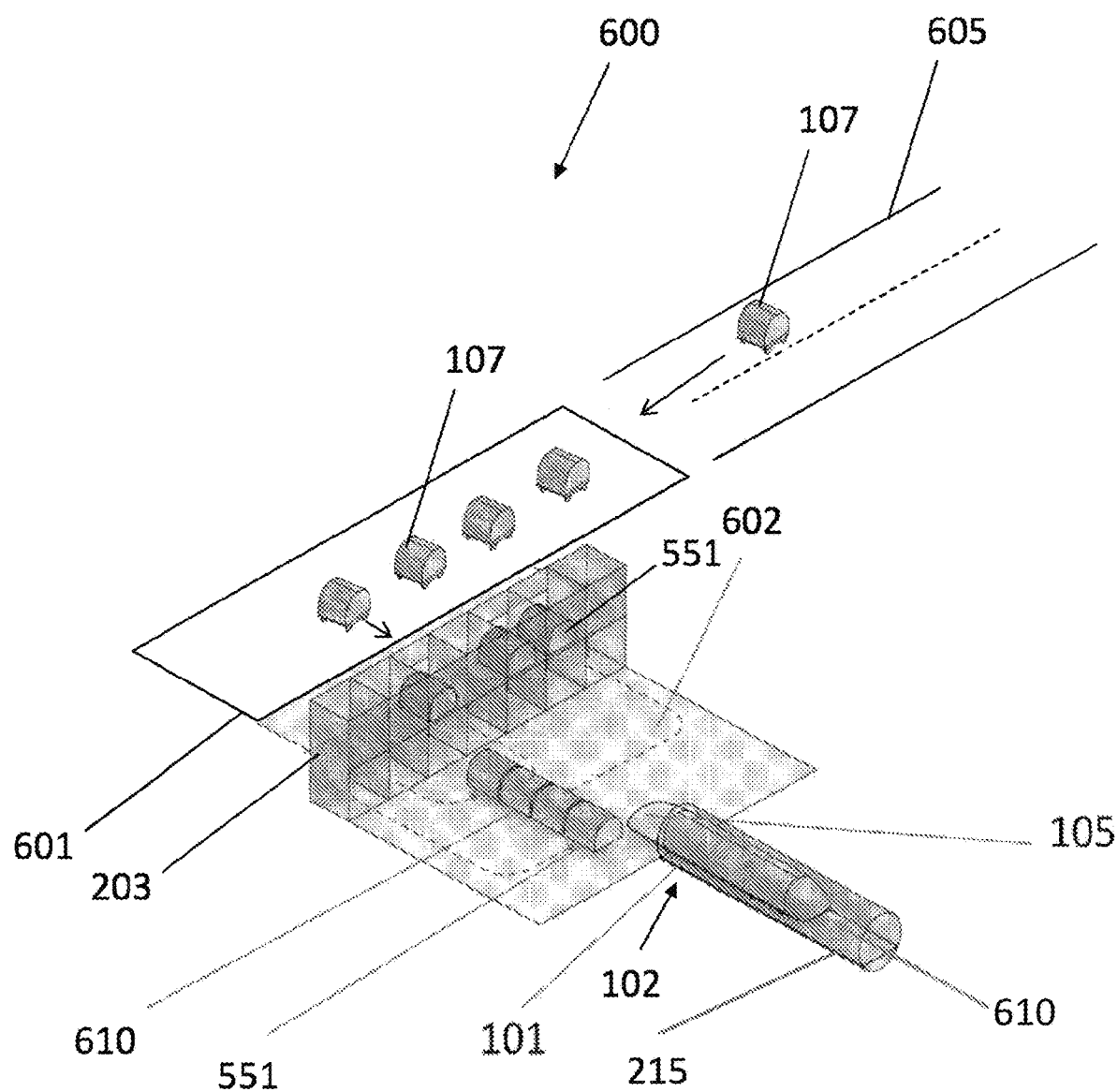
FIGS. 6A-6C schematically depict exemplary airlock loading zones and methods and systems for loading and/or unloading vehicles in accordance with aspects of the disclosure.
Figure 6B:
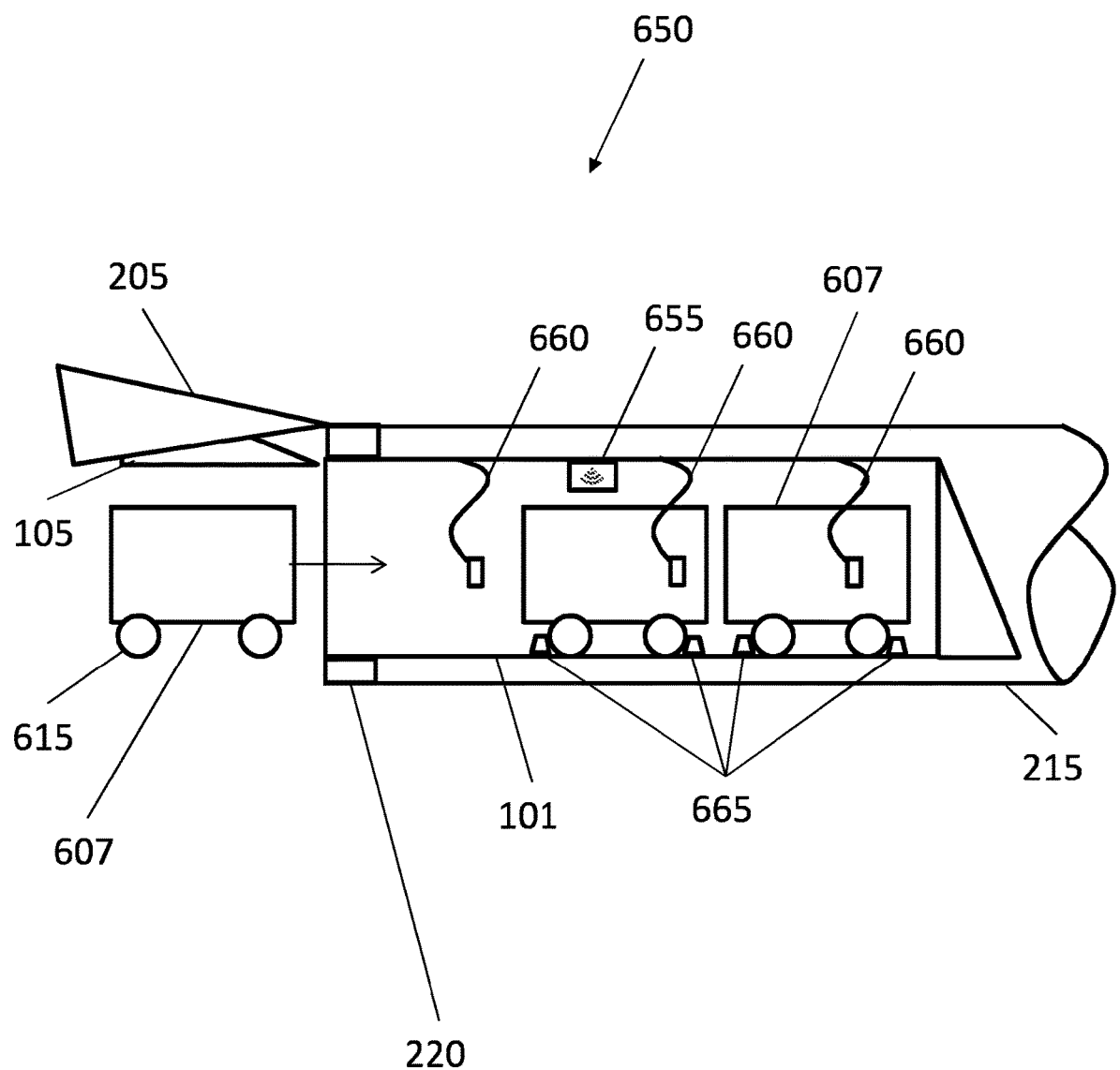
Figure 6C:
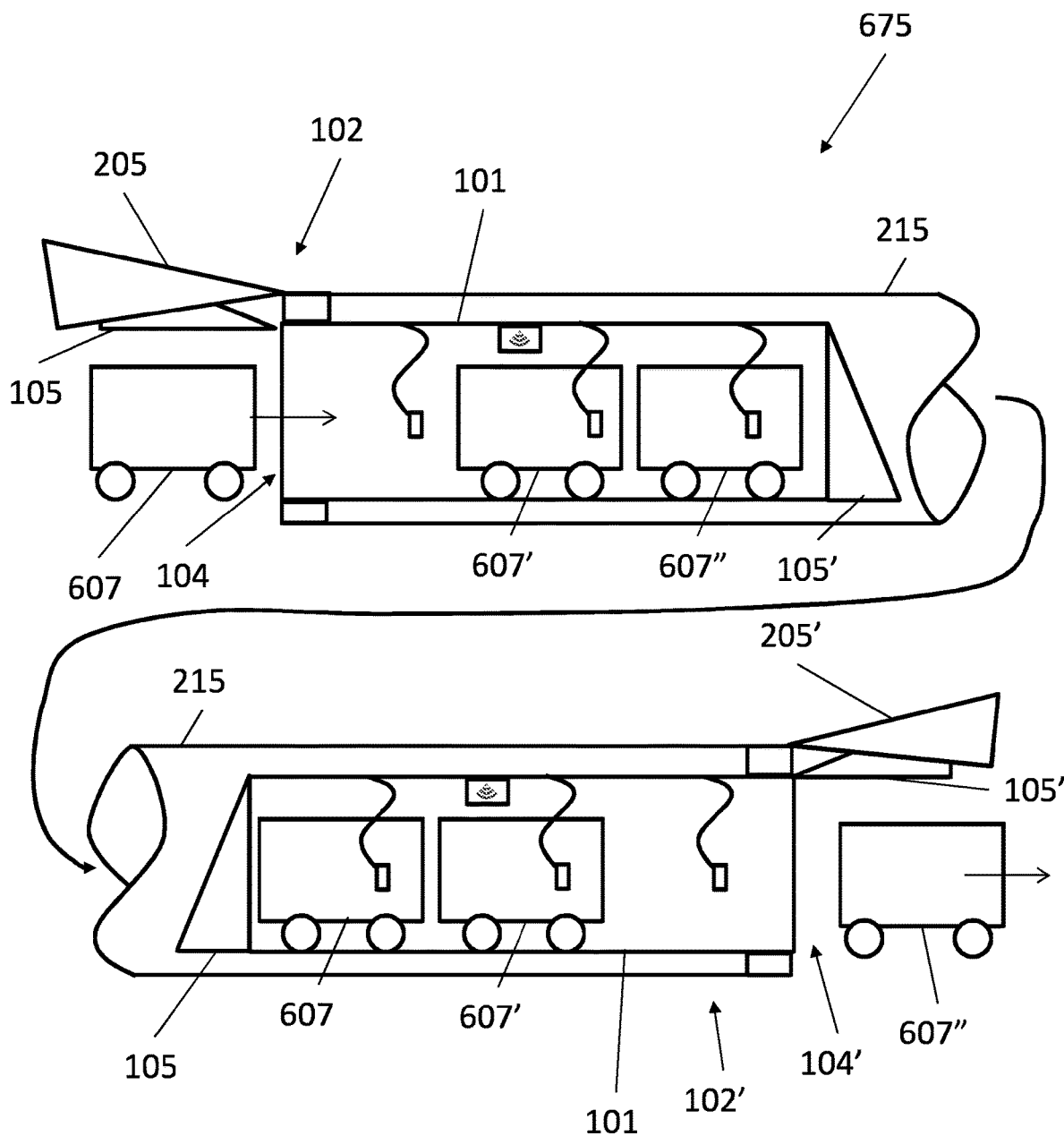

FIGS. 6A-6C schematically depict exemplary methods and systems for loading and/or unloading vehicles (e.g., modular vehicles and/or conventional vehicles) in a high-speed transportation system in accordance with aspects of the disclosure.

FIG. 6A schematically depicts an exemplary method and system 600 for loading modular vehicles 107 and depicts a loading bay 601 and elevator assembly 203 in accordance with aspects of the disclosure. In contrast to the embodiment of FIG. 2A, in which passengers enter a station (e.g., on foot) and subsequently board a capsule for insertion into an outer shell for travel in a high-speed transportation system, with the embodiment of FIG. 6, passengers enter a station via travel in a vehicle (e.g., a modular vehicle 107, as depicted in the exemplary embodiment of FIG. 6A, or a conventional automobile (e.g., electric automobile) not shown). Thus, as shown in FIG. 6A, a plurality of modular vehicles 107 travel along vehicle pathway 605 to arrive at the loading bay 601. At the loading bay 601, the vehicle 107 is directed to an appropriate elevator cabin of the elevator assembly 203 and the payload 551 of the vehicle 107 is removed from the chassis 552. In order to remove the payload 551 of the vehicle 107 from the chassis 552, in embodiments, the loading bay 601 may include lifts and/or cranes, for example. The payload 551 is then moved into an elevator cabin and moved via the elevator system 203 (e.g., horizontally and/or vertically) to an appropriate position in the airlock loading zone 602. For example, as depicted in the schematic exemplary arrangement, the loading bay 601 is located on a first level (e.g., an upper level), and the one or more airlock loading zones 602 may be arranged on one or more second levels (e.g., lower levels). While the exemplary embodiment of FIG. 6A depicts loading of payloads 551 through one side of an elevator cabin and unloading on an opposite side of the elevator cabin, it should be understood that, in contemplated embodiments, the elevator cabin may only have a single entry/exit passage, such that payloads 551 (or capsules 106) are loaded and unloaded through the single entry/exit passage. With such an embodiment, it should be understood that the loading bay 601 may be arranged directly above the airlock loading zones 602, as opposed to the off-set configuration depicted in FIG. 6A.

Once in the airlock loading zone 602, the payloads 551 of the cars 107 (or a plurality of conventional vehicles) may be assembled (or arranged) together into a cartridge 610. In embodiments, the payloads 551 of the cars 107 may operate as automated guided vehicles while within the loading bay 601 and/or airlock loading zone 602. For example, the airlock loading zone may be configured to selectively move each of the payloads 551 of the cars autonomously, such that payloads 551 exiting from different bays the elevator system 203 can quickly and efficiently be grouped and aligned into a cartridge 610 for loading into an outer shell 101.

In such a manner, the payloads 551 may be grouped into a cartridge 610 and loaded into an outer shell 101. Assembly of the payloads 551 into a cartridge 610 may be based, for example, on measurable factors, such as destination, queuing, size, and/or availability. The assembled cartridge 610 is then directed to enter the shell 101 through the shell door 105 while the shell 101 is engaged with the airlock 102. Once the assembled cartridge 610, for example, is loaded in the shell 101, the entirety of the shell 101 (e.g., any portion not already arranged in the airlock 102) is moved into the airlock 102 (or in other embodiments, the airlock is otherwise established around the entire shell 101), and the shell is subsequently launched through the tube 215 into a the low-pressure, high-speed transportation system.

Upon arrival at a destination station, the payloads 551 may be removed from an incoming outer shell 101 and reattached to a respective chassis 552 at the destination station so as to re-form a modular vehicle 107, and the modular vehicle 107 may then exit the destination station (e.g., under human control or under autonomous control) via a destination station outbound vehicle pathway.

FIG. 6B schematically depicts an exemplary method and system 650 for loading vehicles (e.g., electric vehicle, plug-in hybrid vehicle or gas vehicle) in accordance with aspects of the disclosure. In contrast to the exemplary embodiments depicted in FIGS. 2E and 6A, which are configured to accommodate capsules or payloads (e.g., modular vehicles with the chassis removed), with the exemplary embodiment of FIG. 6B, the outer shell 101 is configured to accommodate conventional vehicles 607 with wheels 615 remaining attached. In embodiments, the conventional vehicles may include, for example, gas engine vehicles, electric vehicles, plug-in hybrid vehicles, hybrid vehicles, trucks, semis, trailers. As shown in FIG. 613, once the vehicles 607 are loaded into the outer shell 101 and positioned therein for travel in the outer shell 101, one or more locking mechanisms 665 (which are schematically depicted) may engage with a respective vehicle 607 to prevent movement of the vehicles 607 within the outer shell 101. In embodiments, the locking mechanisms 665 may include wheel stops, for example, manually arrangeable wheel stops or selectively deployable wheel stops that (e.g., are structured and arranged to rise from the floor of the outer shell 101). In other contemplated embodiments, the locking mechanisms 665 may include a wheel clamp (not shown) structured and arranged (e.g., to surround a vehicle wheel 615) to prevent vehicles 607 from being moved.

In accordance with aspects of the disclosure, while the vehicle 607 is engaged with the high-speed transportation system, the high-speed transportation system may interact with the vehicle 607, such as, for example, by providing charging services and a wireless internet connection. Thus, with the exemplary embodiment of FIG. 6B, the outer shell includes a wireless internet connection 655, which is operable to provide wireless internet services to the vehicles 607 while accommodated in the outer shell 101. Additionally, as shown in FIG. 6B the outer shell 101 includes a plurality of charging connections 660 (e.g., for electric vehicles or plug-in hybrid vehicles). In embodiments, the number of charging connections 660 may be equal to or greater than the number of vehicles accommodatable in the outer shell 101. In accordance with aspects of the disclosure, once a vehicle 607 is arranged in the outer shell 101, the driver (or another) may connect his vehicle to an available charging connection 660. In other contemplated embodiments, the connection to a charging connection 660 may be automated using, for example, a computer controlled articulable arm with a charging connection sensor (e.g., position sensor or camera).

FIG. 6C schematically depicts an exemplary method and system 675 for loading and unloading vehicles 607 (e.g., electric vehicle, plug-in hybrid vehicle or gas vehicle) at opposite ends of a tube 215 of a high-speed, low-pressure transportation system in accordance with aspects of the disclosure. As shown in FIG. 6C, an outer shell 101 is being loaded with vehicle 607 at a departure airlock 102, and vehicles 607' and 607" have already been loaded into the outer shell 101. In operation, the outer shell 101 is operable to travel to a destination airlock 102' at a destination station.

As shown in FIG. 6C, with this exemplary embodiment, the outer shell 101 has doors 105, 105' at each end thereof, wherein the door 105 is opened (and door 105' remains closed) when loading the outer shell 101 at the departure airlock 102, and door 105' is opened (and door 105 remains closed) when unloading the outer shell 101 at the destination airlock 102'. The departure airlock 102 also includes a selectively closeable door 205, which when closed, is operable to maintain the low-pressure environment within the tube 215, and destination airlock 102' also includes a selectively closeable door 205', which when closed, is operable to maintain the low-pressure environment within the tube 215. For example, when no outer shell 101 is present at the departure airlock 102, the airlock door 205 is operable to maintain the low-pressure environment within the tube 215, and when no outer shell 101 is present at the destination airlock 102', the airlock door 205' is operable to maintain the low-pressure environment within the tube 215.

As shown in FIG. 6C, vehicle 607" was first loaded through opening 104 into the outer shell 101, followed by vehicle 607', and then vehicle 607. Additionally, as shown in FIG. 6C, vehicle 607" is first unloaded from the outer shell 101 through opening 104', followed by vehicle 607', and then vehicle 607. In such a manner, with this exemplary embodiment, the vehicles (607, 607' and 607") are loaded and unloaded in a first-in/first out (FIFO) order.

While the exemplary loading/unloading process is depicted as in one door (e.g., door 105) and out the other door (e.g., door 105') of the outer shell, the disclosure contemplates that the loading/unloading process could be in and out the same door. In other words, the disclosure contemplates that in some embodiments, an outer shell 101 may only be provided with a single door 105 for both loading and unloading. Thus, while not depicted in the figures, with other contemplated embodiments, for example, upon arrival at a destination station, the outer shell may be rotated approximately 180° (e.g., using a turntable apparatus) prior to engagement with an airlock and unloading of the outer shell. With such embodiments, the vehicles, cars, and/or capsules (and/or cartridges) may be loaded and unloaded in a first-in/last out (FILO) order.

Flow Diagrams

FIGS. 7A-11 show exemplary flows for performing aspects of the present disclosure. The steps of FIGS. 7A-11 may be implemented in the environment of FIG. 12, for example. The flow diagrams may equally represent high-level block diagrams of embodiments of the disclosure. The flowchart and/or block diagrams of FIGS. 7A-11 illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s), (and/or it may represent a piece of hardware). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

Furthermore, embodiments of the disclosure can take the form of a computer program product accessible from a computer-usable or computer-readable medium providing program code for use by or in connection with a computer or any instruction execution system. The software and/or computer program product can be implemented in the environment of FIG. 12. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Examples of optical disks include compact disk—read only memory (CD-ROM), compact disc—read/write (CD-R/W) and DVD.

Figure 7A:
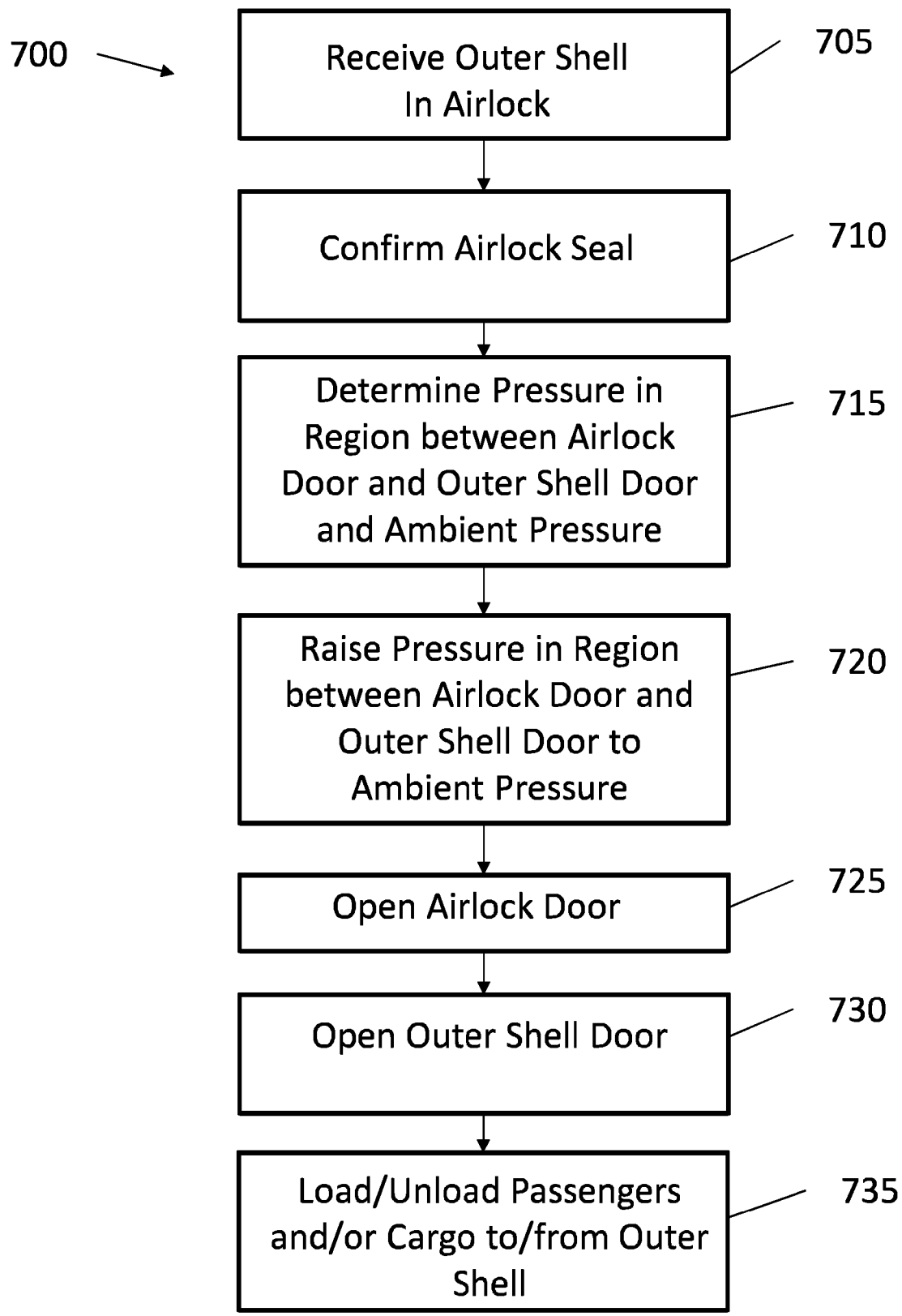
FIGS. 7A and 7B depict exemplary processes for receiving an outer shell at an airlock and loading capsule, cartridges and/or vehicles into the shell at the airlock, and launching the outer shell from the airlock in accordance with aspects of the disclosure.
Figure 7B:
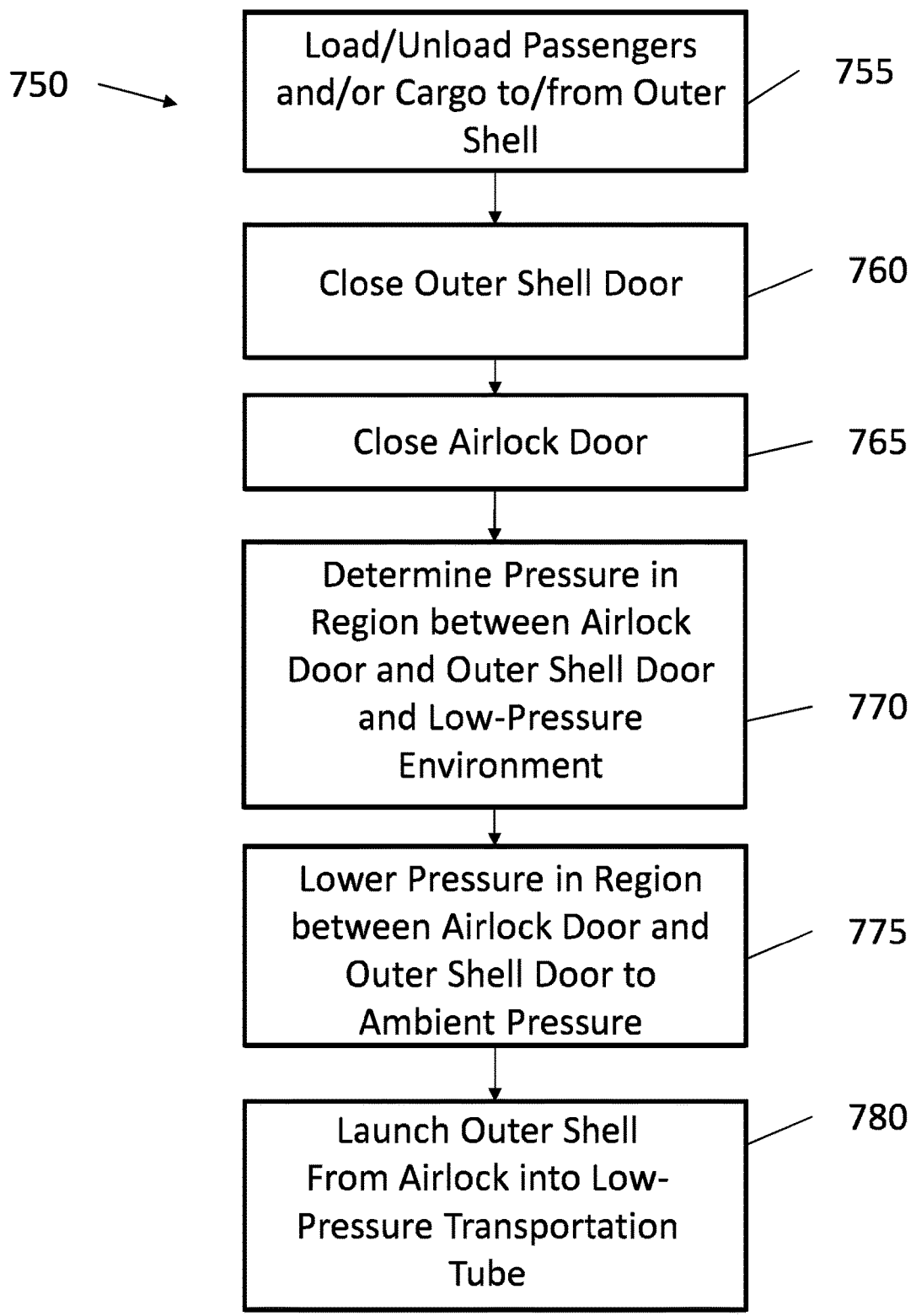

FIGS. 7A and 7B depict exemplary processes for receiving an outer shell at an airlock and loading capsules, cartridges and/or vehicles (or cars) into the shell at the airlock, and launching the outer shell from the airlock, in accordance with aspects of the disclosure. More specifically, FIG. 7A depicts an exemplary process 700 for receiving a shell at an airlock and unloading capsules, cartridges and/or vehicles from the shell at the airlock in accordance with aspects of the disclosure. For example, as shown in FIG. 7A, at step 705, an outer shell is received in an airlock. In embodiments, this outer shell may have no passengers and/or cargo on board (i.e., an initial loading of the outer shell), or the outer shell may contain passengers and/or cargo (e.g., the outer shell has arrived at the airlock via travel in the high-speed, low-pressure transportation system). At step 710, a control system is operable to confirm an air lock seal (e.g., by monitoring pressures in tube of the high-speed, low-pressure transportation system and pressure in the region between the outer shell door and the airlock door, while slightly altering the pressure therein). At step 715, the control system is operable to determine a pressure in the region between the outer shell door and the airlock door and the pressure outside of the airlock door (e.g., ambient pressure in the airlock loading zone). At step 720, the control system is operable to raise the air pressure in the region between the outer shell door and the airlock door to ambient pressure, so as to equalize with the pressure in the airlock loading zone). At step 725, the control system is operable to open the airlock door so as to expose the region between the outer shell door and the airlock door. At step 730, the control system is operable to open the outer shell door so as to expose the region between the outer shell door and the airlock door. At step 735, the control system is operable to unload capsules/vehicles containing passengers and/or cargo from the outer shell and/or load capsules/vehicles containing passengers and/or cargo into the outer shell.

FIG. 7B depicts an exemplary process 750 for loading an outer shell at an airlock with capsules, cartridges and/or vehicles and launching the shell from the airlock in accordance with aspects of the disclosure. For example, as shown in FIG. 7B, at step 755, the control system is operable to load capsules/vehicles containing passengers and/or cargo to the outer shell (and/or unload capsules/vehicles containing passengers and/or cargo from the outer shell). At step 760, the control system is operable to close the outer shell door. At step 765, the control system is operable to close the airlock door. At step 770, the control system is operable to determine pressures in the region between the outer shell door and the airlock door and the pressure of the low-pressure environment of the transportation tube. At step 775, the control system is operable to lower the air pressure in the region between the outer shell door and the airlock door to the pressure of the low-pressure environment to equalize the pressure between these two regions. At step 780, the control system is operable to launch the outer shell from the airlock into the low-pressure transportation system.

Figure 8:
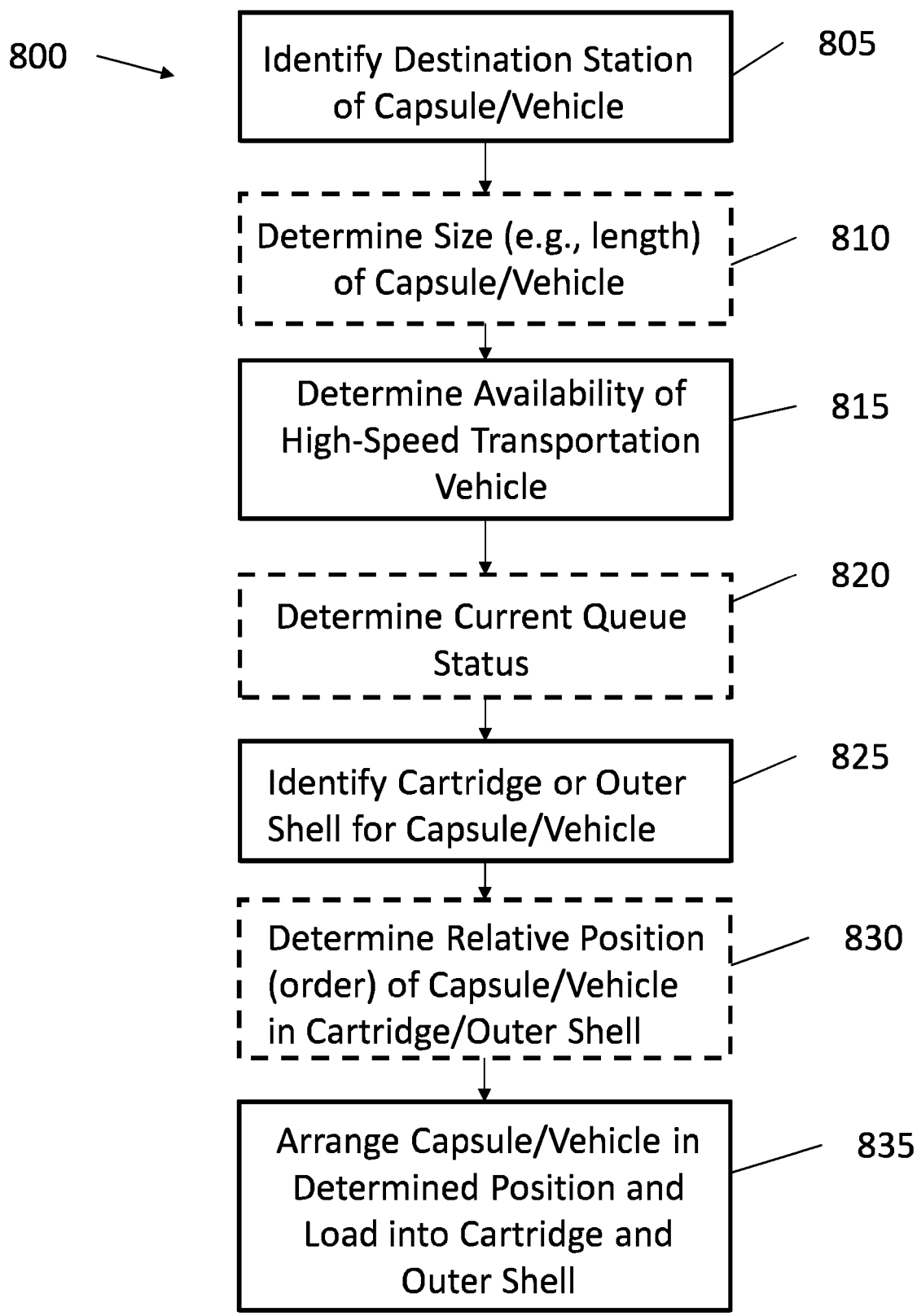
FIG. 8 depicts an exemplary process for assembling cartridges into a group for loading into a shell in accordance with aspects of the disclosure.

FIG. 8 depicts an exemplary process 800 for assembling capsules (and/or cars) into a cartridge for loading into a shell in accordance with aspects of the disclosure. As shown in FIG. 8, at step 805, a control system is operable to identify a destination station of a particular capsule or car (e.g., modular vehicle or conventional automobile). In embodiments, the destination information may, for example, be manually input by a passenger (e.g., when ordering a transportation service or when entering a departure station). In other contemplated embodiments, a capsule may have a machine-readable marking (e.g., bar code or Datamatrix code) indicating a destination station (or final destination downstream of a destination station). At optional step 810 (as indicated by the dashed-line border), the control system is operable to identify a size (e.g., length) of a particular capsule or vehicle so as to determine the size requirements necessary for grouping the particular capsule or vehicle with other capsules or vehicles. At step 815, the control system is operable to determine the availability of a high-speed transportation vehicle for the particular capsule or vehicle. At optional step 820, the control system is operable to determine a current queue status for capsules or vehicles in the departure station. Current queue status information may include how many capsules are "in line" ahead of the particular capsule or vehicle, how many capsules destined for the same destination are "in line" ahead of the particular capsule or vehicle, and/or the anticipated wait time for the particular capsule or vehicle to be loaded into an outer shell.

At step 825, the control system is operable to identify and/or designate a cartridge and/or outer shell for accommodating the particular capsule or vehicle. In embodiments, the identification of the cartridge and/or outer shell for accommodating the particular capsule or vehicle may be based upon the destination of the capsule/vehicle, the capsule/vehicle size (e.g., length), high-speed transportation vehicle availability, and a current queue status, amongst other contemplated variables and/or measurable factors.

At optional step 830, the control system is operable to determine a relative position of the capsule/vehicle in the cartridge and/or outer shell. For example, an outer shell may have four positions for capsules or vehicle, and it may be desirous to have a particular capsule in the first position. In the first position, the capsule may be the first loaded into the outer shell, and thus, may spend additional time therein, while subsequent capsules and/or vehicles are loaded behind it in the outer shell. At the destination station, however, in embodiments where the outer shell has doors at both ends thereof, the capsule in the first position is off-loaded from the outer shell first.

At step 835, the control system is operable to move the capsule or vehicle on the floor of the airlock loading zone so as to arrange the capsule or vehicle in the determined order or position. Upon linearly arranging the capsules or vehicles as a cartridge, the control system is operable to load the capsules, vehicles, and/or cartridges into the outer shell. As noted above, in moving the capsules or vehicles on the floor of the airlock loading zone, the control system may utilize an automated guided vehicle system.

Vehicle Range Extension Using a High-Speed Transportation System

Additional aspects of the disclosure are directed to a system and method for vehicle range extension using a high-speed transportation system. For example, in embodiments, an automobiles' range may be extended by combining transport via the automobile with transport using the high-speed transportation system.

Figure 9:
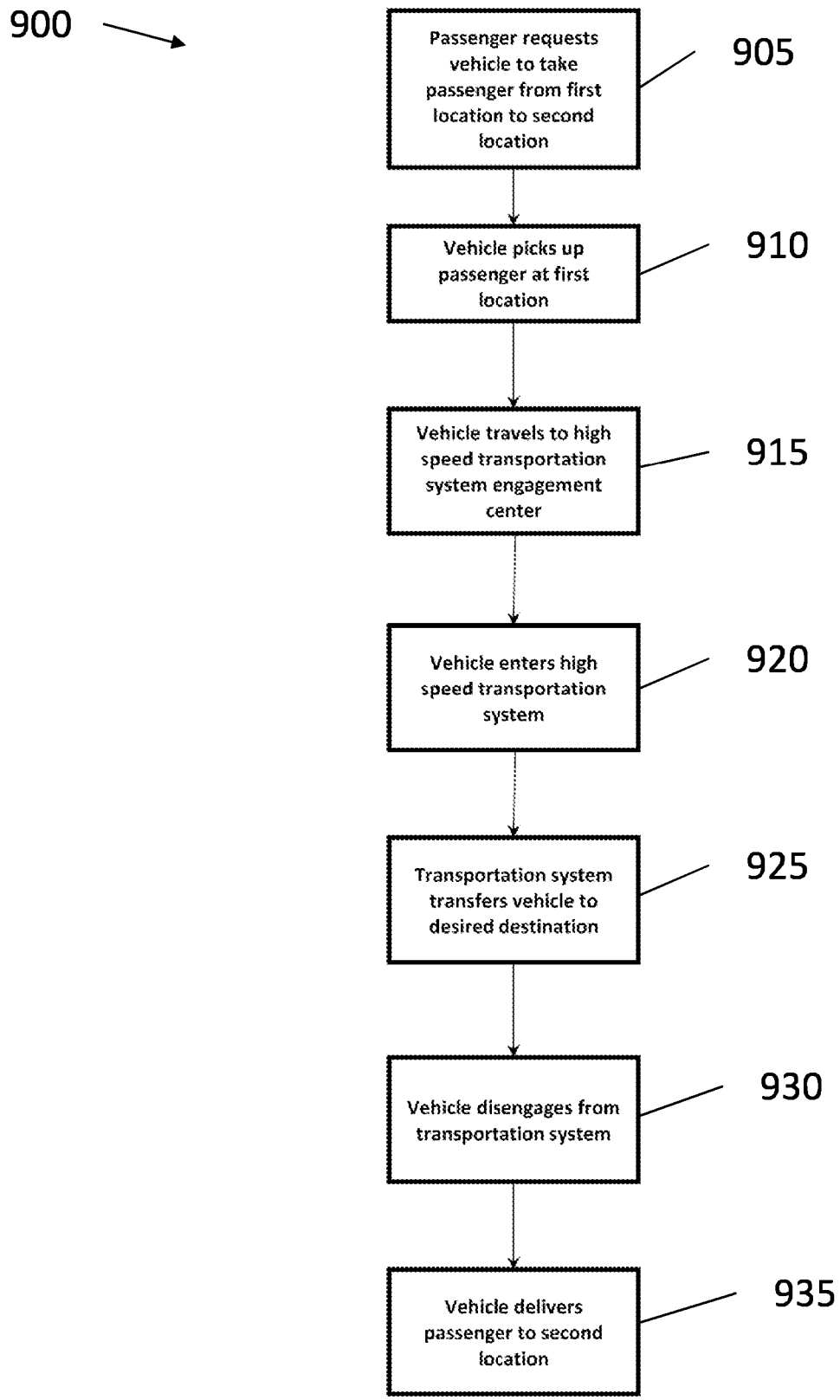
FIG. 9 depicts an exemplary process for utilizing a high-speed transportation system to extend the range of automobile vehicles in accordance with aspects of the disclosure.

FIG. 9 depicts an exemplary process 900 for utilizing a high-speed transportation system to extend the range of automobile vehicles (e.g., gas engine vehicles, electric vehicles, hybrid vehicles) in accordance with aspects of the disclosure. As shown in FIG. 9, in an exemplary process, a passenger in a first location, e.g., a home somewhere in San Francisco, desires to travel to a destination, e.g., somewhere in Los Angeles. At step 905, the passenger may solicit a vehicle, e.g., via a ride share operation, for example, using their mobile telephone. At step 910, the vehicle may arrive at the passenger's location, and the passenger engages with (e.g., enters or boards) the vehicle. At step 915, the vehicle travels from the origination point (i.e., the pick-up location) to a loading station for a high-speed transportation system. At step 920, the vehicle engages with the high-speed transportation system, such as by entering an outer shell. While the vehicle is engaged with the high-speed transportation system, the high-speed transportation system may interact with the vehicle, such as by providing charging services and a wireless internet connection. At step 925, the outer shell transits via the high-speed transportation system to a location substantially near the final destination. At step 930, the vehicle departs the high-speed transportation system. At step 935, the vehicle brings the passenger to their final destination.

Additional aspects of the disclosure are directed to a system and method for using an autonomous vehicle in combination with a high-speed transportation system to provide goods or services. For example, in embodiments, an autonomous vehicle's range may be extended (or an autonomous vehicle's time to destination may be reduced) by combining transport via the autonomous vehicle with transport using the high-speed transportation system.

Figure 10:
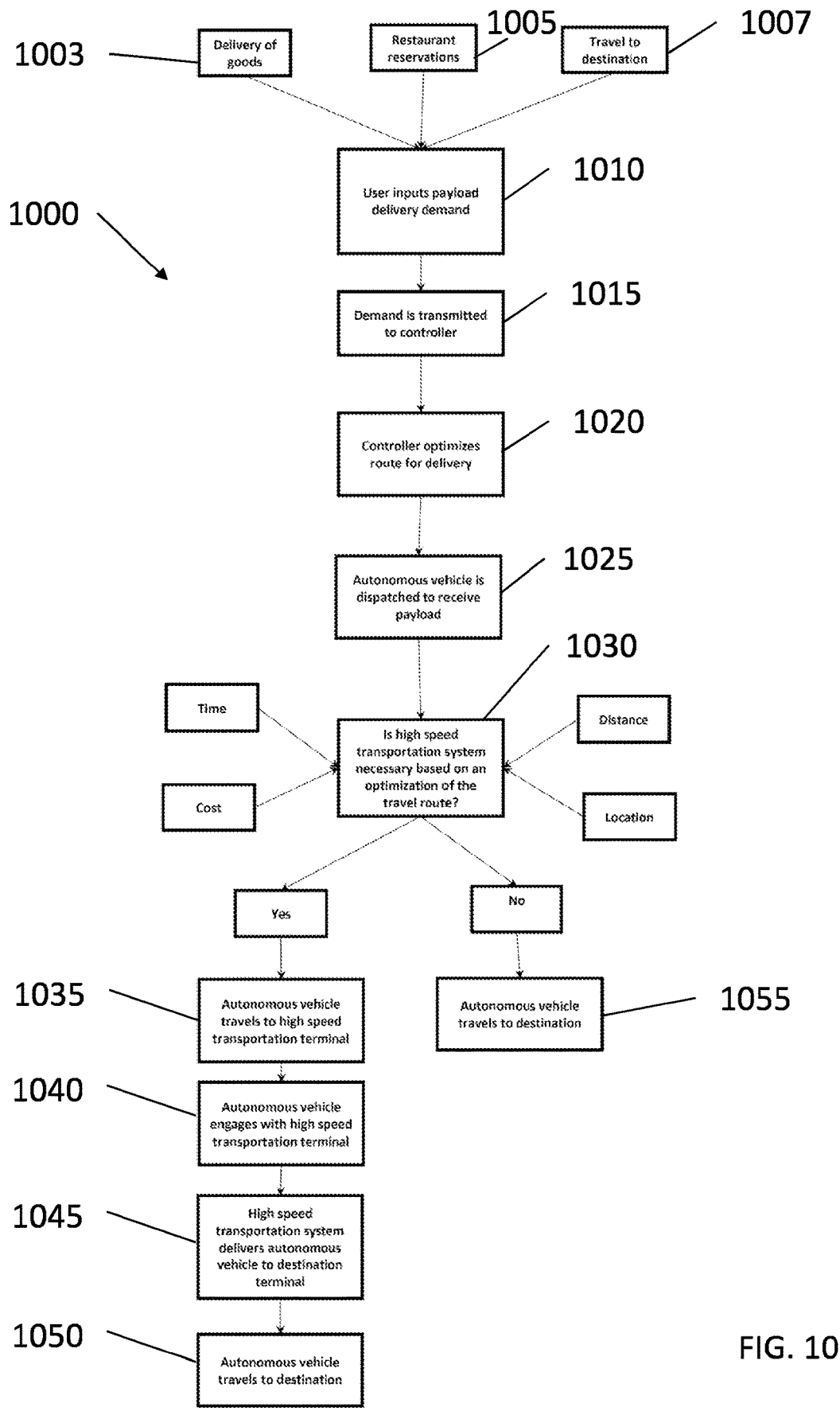
FIG. 10 depicts an exemplary process for providing an autonomous vehicle interface with a high-speed transportation system.

FIG. 10 depicts an exemplary method 1000 for using an autonomous vehicle in combination with a high-speed transportation system to provide goods or services in accordance with aspects of the disclosure. A user may have any number of requests for using an autonomous vehicle in combination with a high-speed transportation system to provide goods or services. Such requests (which may be made using a graphical user interface of a mobile communication device) include, for example, ordering and receiving goods 1003, making restaurant reservations 1005, and/or travel to a destination 1007.

As shown in FIG. 10, at step 1010, a user may input a request for using an autonomous vehicle in combination with a high-speed transportation system to provide goods or services using, for example, an interface of a mobile communication device. At step 1015, the user demand is transmitted to and received by a route optimization controller. For example, in embodiments, the destination may be inputted by the user and/or determined from the nature of the request, such as a restaurant location when reservations are made in the interface. At step 1120, the route optimization controller is operable to optimize the travel path between a departure location and a destination location based on the request and available high-speed transportation system departure/arrival locations, and high-speed transportation system paths.

At step 1025, the controller is operable to send an autonomous vehicle to the departure location where it may pick up (or be loaded with) a payload. As should be understood, in embodiments, the payload may include freight, cargo, passengers, and/or goods. At step 1030, the controller is operable to determine whether the autonomous vehicle should utilize a high-speed transportation system based on any of a number of factors, such as time, cost, distance, destination location, and high-speed transportation station locations, amongst other contemplated factors. The controller may then direct the autonomous vehicle to the optimized route. If, at step 1030, the route optimization controller determines that the high-speed transportation system should be used, the controller may arrange all aspects of usage of the high-speed transportation system, such as making a reservation and/or purchasing tickets. At step 1035, the controller may then direct the autonomous vehicle to enter a high-speed transportation system terminal that is optimized for the route, where, at step 1040, the autonomous vehicle engages with the high-speed transportation system. While the autonomous vehicle is engaged with the high-speed transportation system, the controller, the autonomous vehicle, and the high-speed transportation system may share all data necessary for the trip. In embodiments, shared data may include current location (e.g., GPS location data in real time), speed, and destination. As discussed above, the high-speed transportation system may also be configured to physically dock with the autonomous vehicle to provide services, including charging and/or wireless internet connection. At step 1045, the high-speed transportation system delivers the autonomous vehicle to a destination terminal that is selected according to the optimized route to the final destination. At step 1050, the autonomous vehicle disengages from the high-speed transportation system. The autonomous vehicle then delivers the payload to the final destination. If, at step 1030, the controller determines that the high-speed transportation system should not be used, at step 1055, the route optimization controller instructs the autonomous vehicle travels to the final destination.

Asset Management/Optimization Using a High-Speed Transportation System

Additional aspects of the disclosure are directed to asset management using a high-speed transportation system. In embodiments, asset management may include moving vehicles (e.g., autonomous vehicles, semi-autonomous vehicles, human-controlled vehicles) from one location (e.g., with relatively lower demand) to a second location (with relatively higher demand).

Figure 11:
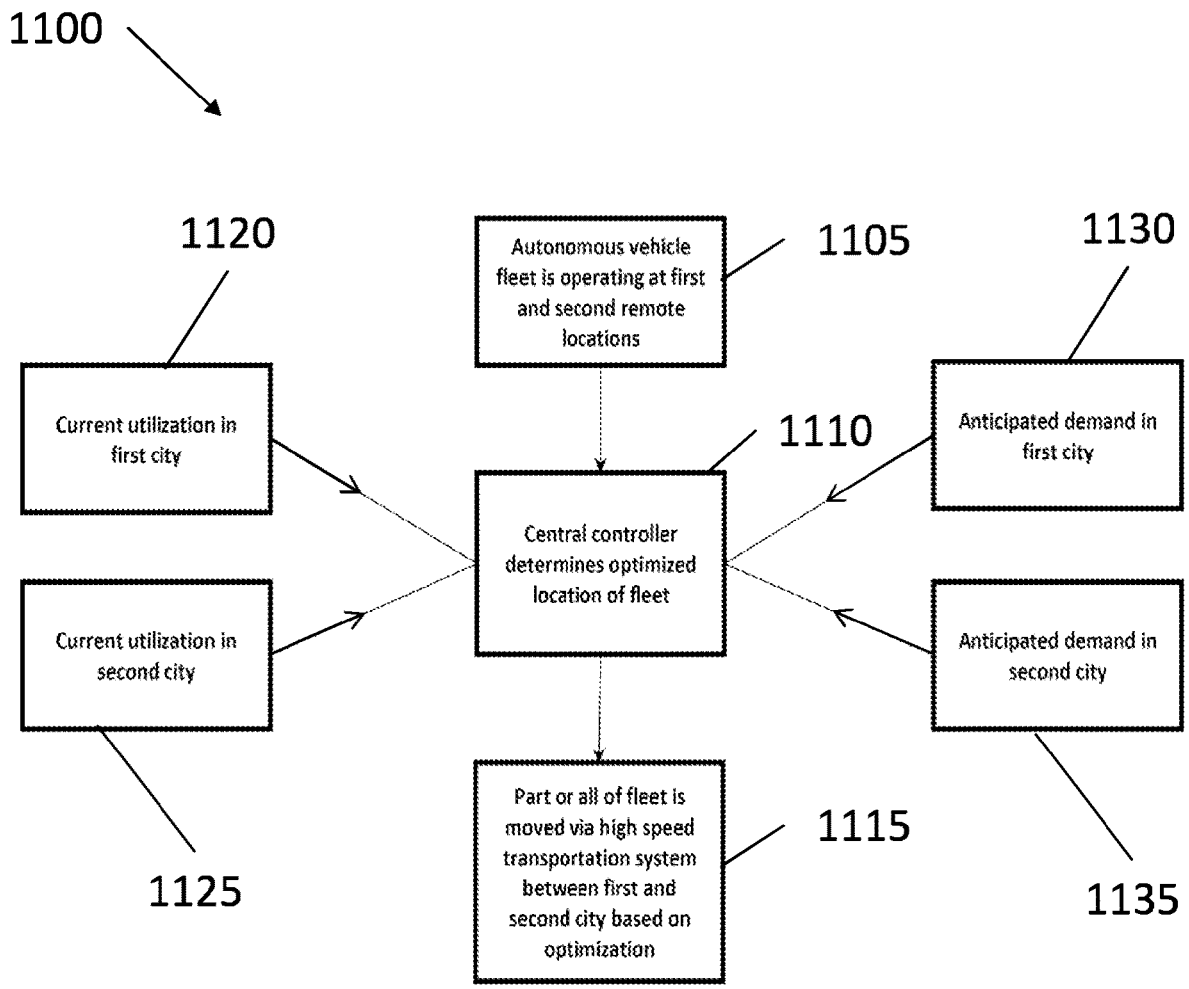
FIG. 11 depicts an exemplary process for optimizing assets across geographically remote locations in accordance with aspects of the disclosure.

FIG. 11 depicts an exemplary method 1100 for optimizing an asset, e.g., a fleet of autonomous vehicles, across geographically remote locations. A high-speed transportation system may connect a plurality of geographically remote locations, such as through a point-to-point system and/or through a network. At step 1105, the control system identifies autonomous vehicles operating at the first and second remote locations. The control system may utilize, for example, GPS and individual vehicle identifiers to identify vehicles operating at the first and second remote locations. As shown in FIG. 11, depending on factors, including utilization at the first location 1120, anticipated demand at the first location 1130, utilization at the second location 1125, anticipated demand at the second location 1135, at step 1110, the controller is operable to determine the ideal apportionment of the fleet across both locations simultaneously, e.g., to relocate portions or all of the fleet from one location to the second location via the high-speed transportation system. At step 1115, the system directs part or all of the fleet to be moved via a high-speed transportation system, between the first and second location based on optimization of the fleets.

System Environment

Aspects of embodiments of the present disclosure (e.g., control systems for the loading/unloading systems) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a usb key, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, embodiments of the present disclosure may be embodied in a field programmable gate array (FPGA).

Figure 12:
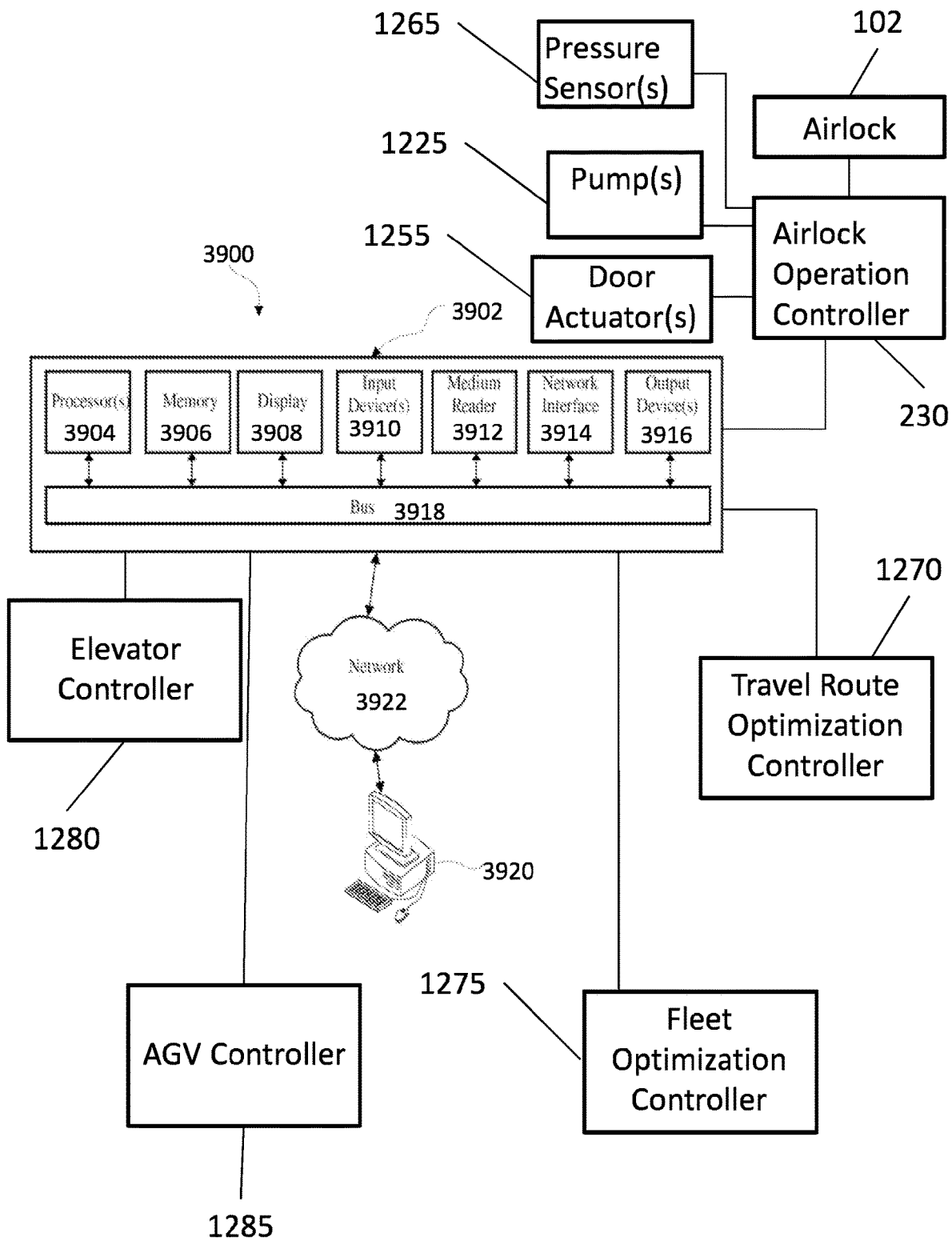
FIG. 12 is an exemplary system for use in accordance with the embodiments described herein.

FIG. 12 is an exemplary system for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks or cloud environment.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 12, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 12, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof.

As additionally shown in FIG. 12, computer system 3902 may communicate (e.g., via a wired connection and/or wirelessly) with an airlock operation controller 230. The airlock operation controller 230 is in communication with (e.g., via a wired connection and/or wirelessly) and operable to receive data from and/or communicate instructions to one or more pressure sensors 1265, one or more pumps 1225, and one or more door actuators 1255.

As further shown in FIG. 12, in embodiments, the computer system 3902 may communicate (e.g., via a wired connection and/or wirelessly) with a travel route optimization controller 1270, which is operable to determine an optimized travel route from an origination point to a destination point that may possibly utilize a vehicle in combination with a high-speed, low-pressure transportation system, as discussed herein.

Additionally, as shown in FIG. 12, in embodiments, the computer system 3902 may communicate (e.g., via a wired connection and/or wirelessly) with a fleet optimization controller 1275, which is operable to determine current and anticipated vehicle demands in multiple regions, and control transfer of vehicles via a high-speed transportation system from a region of lower demand to higher demand.

As also shown in FIG. 12, in embodiments, the computer system 3902 may communicate (e.g., via a wired connection and/or wirelessly) with an elevator controller 1280, which is operable to control operation of an elevator system (e.g., vertical/horizontal elevator) for moving capsules, cars, payloads from a loading bay to an airlock loading zone, and vice versa.

As further illustrated in FIG. 12, in embodiments, the computer system 3902 may communicate (e.g., via a wired connection and/or wirelessly) with an AGV (automated guided vehicle) controller 1280. The AGV controller 1280 is operable to control an AGV system to move capsules and/or payloads, for example, in the airlock loading zone to arrange capsules and/or payloads into a cartridge for insertion into an outer shell (and for an unloading process, in which capsules and/or payloads are unarranged from the cartridge (or linear arrangement) and directed to respective elevator cabins for transport to the loading bay level). In embodiments, the AGV controller 1280 may be in communication with and utilize, for example, GPS, lasers, and/or magnetic strips to guide the capsules and/or payloads.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments am described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

Thus, while the specification describes particular embodiments of the present disclosure, those of ordinary skill can devise variations of the present disclosure without departing from the inventive concept. For example, while discussed in context of high-speed, low-pressure transportation system, it should be understood that the disclosure contemplates that other transportation systems may utilize aspects of the loading/unloading processes and structures of the present disclosure. For example, the transportation system may include a high-speed transportation system (e.g., maglev (magnetic levitation) train) that does not utilize a low-pressure environment.

Insofar as the description above and the accompanying drawing disclose any additional subject matter that is not within the scope of the claims below, the embodiments are not dedicated to the public and the right to file one or more applications to claim such additional embodiments is reserved.

The invention claimed is:

1. A method for asset management of a fleet of cars, the method comprising:
   moving the fleet of cars from a first location to a departure high-speed transportation station;
   operating a modular loading and unloading system, the method of operating the modular loading and unloading system comprising:
   receiving a plurality of cars of the fleet of cars in an airlock loading zone adjacent to at least one airlock connecting the airlock loading zone to a transportation tube of a high-speed transportation system, wherein the at least one airlock is operable to both receive a high-speed transportation vehicle that is incoming from the transportation tube and release the high-speed transportation vehicle into the transportation tube;

arranging a plural selection of the plurality of cars into a grouping for insertion into the high-speed transportation vehicle in the at least one airlock using an automated guided vehicle system operable to move the selection of the plurality of the cars along a floor of the airlock loading zone into the grouping; and inserting the grouping into the high-speed transportation vehicle, while the high-speed transportation vehicle is at least partially in the at least one airlock, wherein the at least one airlock includes a sealer structured and is arranged to interact with an outer shell of the high-speed transportation vehicle when inside the at least one airlock, such that the sealer and the high-speed transportation vehicle together provide a first air pressure barrier between a relatively lower pressure in the tube and a relatively higher pressure of the airlock loading zone;

moving the fleet of cars from the departure high-speed transportation station to an arrival high-speed transportation station via the high-speed transportation system;

unloading the fleet of cars from the high-speed transportation vehicle; and moving the fleet of cars from the arrival high-speed transportation station to a second location.

2. The method of claim 1, further comprising moving the plurality of cars to the airlock loading zone from a loading bay, wherein the moving comprises using one or more elevators.

3. The method of claim 1, wherein respective cars of the fleet of cars are designated for transport in another high-speed transportation vehicle; the method further comprising moving the respective cars to the airlock loading zone, wherein the arranging the plurality of cars for insertion into the other high-speed transportation vehicle comprises linearly arranging the respective cars for serial loading into the other high-speed transportation vehicle.

4. The method of claim 1, further comprising:
receiving the plurality of cars at a loading bay; and
moving the plurality of cars to the airlock loading zone.

5. The method of claim 1, wherein the high-speed transportation vehicle includes an outer shell door, and wherein the at least one airlock includes an airlock door, the method further comprising closing the outer shell door and closing the airlock door after the inserting.

6. The method of claim 5, further comprising lowering a pressure in a region between the shell door and the first pressure barrier so as to equalize the pressure in the region with a pressure within the tube of the high-speed transportation system.

7. The method of claim 1, wherein the arranging the plurality of cars is based on at least one of destination, high-speed transportation vehicle availability, a size of the plurality of cars, and a current queue.

8. The method of claim 1, wherein the sealer comprises at least one O-ring seal with an outer diameter approximating an inner diameter of the tube, and an inner diameter approximating an outer perimeter of the high-speed transportation vehicle.

9. The method of claim 5, further comprising:
receiving the high-speed transportation vehicle at the at least one airlock;
engaging the outer shell of the high-speed transportation vehicle with the sealer to provide the air pressure barrier between the relatively lower pressure in the tube and the relatively higher pressure of the airlock loading zone;
raising the pressure in a region between the outer shell door of the high-speed transportation vehicle and the airlock door of the at least one airlock so as to equalize the pressure in the region with a pressure in the airlock loading zone;
opening the airlock door and opening the outer shell door to provide an egress from an interior of the high-speed transportation vehicle; and
unloading the plurality of cars from the interior of the high-speed transportation vehicle.

10. The method of claim 1, further comprising:
quantifying a pressure in the tube using a first pressure sensor arranged in the tube;
quantifying a pressure in a region between an airlock door and the first pressure barrier using a second pressure sensor arranged adjacent the airlock door; and
quantifying a pressure in the airlock loading zone using a third pressure sensor in the airlock loading zone.

11. The method of claim 10, further comprising increasing and decreasing pressure in the region between the airlock door and the first pressure barrier.

12. The method of claim 1, wherein the high-speed transportation vehicle includes an outer shell door, which provides access to a payload area of the high-speed transportation vehicle when opened.

13. The method of claim 10, further comprising using an airlock controller to control operation of a pump based on a pressure in the region between the airlock door and the first pressure barrier, and wherein the airlock controller is operable to control opening and closing of the airlock door and an outer shell door.

14. The method of claim 1, further comprising a loading bay configured for:
receiving the plurality of cars, and/or
loading and unloading the plurality of cars into a plurality of capsules.

15. The method of claim 1, further comprising using an elevator system arranged between a loading bay and the airlock loading zone, and wherein the elevator system is configured to move the plurality of cars between the loading bay and the airlock loading zone.

16. The method of claim 15, wherein the elevator system is operable to move the plurality of cars vertically and/or horizontally.

17. The method of claim 1, wherein the fleet of cars comprise modular cars having a respective car payload that is removeably attachable to a chassis.

18. The method of claim 1, wherein the fleet of cars comprise autonomous vehicles.

19. The method of claim 1, wherein at least one car of the fleet of cars is an electric vehicle or a plug-in hybrid vehicle, the method further comprising charging a battery of the at least one car while the car is in the high-speed transportation vehicle.

20. The method of claim 1, further comprising providing wireless internet access to at least one car of the fleet of cars while the at least one car is in the high-speed transportation vehicle.

* * * * *